United States Patent
Hollar

(10) Patent No.: US 11,463,971 B2
(45) Date of Patent: Oct. 4, 2022

(54) METHODS FOR DETERMINING LOCATION OF UNKNOWN DEVICES IN A SYNCHRONIZED NETWORK AND RELATED SYSTEMS

(71) Applicant: Wiser Systems, Inc., Raleigh, NC (US)

(72) Inventor: Seth Edward-Austin Hollar, Raleigh, NC (US)

(73) Assignee: Wiser Systems, Inc., Raleigh, NC (US)

( * ) Notice: Subject to any disclaimer, the term of this patent is extended or adjusted under 35 U.S.C. 154(b) by 410 days.

(21) Appl. No.: 16/662,307

(22) Filed: Oct. 24, 2019

(65) Prior Publication Data
US 2020/0059880 A1    Feb. 20, 2020

Related U.S. Application Data

(63) Continuation of application No. 15/767,522, filed as application No. PCT/US2016/061083 on Nov. 9, 2016, now Pat. No. 10,462,762.
(Continued)

(51) Int. Cl.
*H04W 24/00* (2009.01)
*H04W 56/00* (2009.01)
(Continued)

(52) U.S. Cl.
CPC ......... *H04W 56/0015* (2013.01); *G01S 5/021* (2013.01); *G01S 5/0218* (2020.05);
(Continued)

(58) Field of Classification Search
CPC ......... H04W 56/0015; H04W 56/0025; H04W 56/006; H04W 56/0065; H04W 56/56;
(Continued)

(56) References Cited

U.S. PATENT DOCUMENTS 5,241,688 A * 8/1993 Arora .................. H04B 7/2675
                                                           370/350
6,300,904 B1 * 10/2001 Dvorak .................... G01S 5/12
                                                           342/457
(Continued)

FOREIGN PATENT DOCUMENTS

WO    WO 98/30026        7/1998
WO    WO 01/65749 A1     9/2001
(Continued)

OTHER PUBLICATIONS

International Search Report and Written Opinion, PCT/US2016/061083, dated Feb. 9, 2017, 5 pages.
(Continued)

*Primary Examiner* — Stephen M D Agosta
(74) *Attorney, Agent, or Firm* — Stanek Lemon Crouse & Meeks, PA

(57) ABSTRACT

Methods for determining a location of an unknown device (UD) from a plurality of known devices (KDs) are provided including receiving, at the UD, periodically broadcasted messages from each of a plurality of KDs. Corresponding arrival time stamp ($T_{arrival-i-UD}$) of each periodically broadcasted message from each of the plurality of KDs are recorded. Each of the plurality of KDs are clock synchronized to a common clock source at a master device (MD). A departure time of the periodically broadcasted message from each of the plurality of KDs is known by the UD in master device time units ($T_{depart-i-md}$). X, y and z coordinates of a location of each of the KDs is known by the UD. The x, y and z coordinates of an actual location of the UD is calculated using the x, y and z coordinates of each of the KDs, the recorded arrival times ($T_{arrival-i-UD}$) of each of the periodically broadcasted messages from each of the plurality of KDs and the known departure times of each of the
(Continued)

periodically broadcasted messages ($T_{depart-i-md}$) from each of the plurality of KDs.

17 Claims, 15 Drawing Sheets

Related U.S. Application Data

(60) Provisional application No. 62/252,753, filed on Nov. 9, 2015.

(51) Int. Cl.
    *H04H 20/18*      (2008.01)
    *G01S 5/14*      (2006.01)
    *G01S 5/02*      (2010.01)
    *G01S 11/08*      (2006.01)
    *G01S 5/00*      (2006.01)

(52) U.S. Cl.
    CPC .............. *G01S 5/0263* (2013.01); *G01S 5/14* (2013.01); *G01S 11/08* (2013.01); *H04H 20/18* (2013.01); *H04W 56/006* (2013.01); *H04W 56/007* (2013.01); *H04W 56/0025* (2013.01); *H04W 56/0065* (2013.01); *G01S 5/00* (2013.01)

(58) Field of Classification Search
    CPC ........... H04W 56/007; H04W 72/1284; H04W 72/1273; H04W 84/06; G01S 5/0218; G01S 5/021; G01S 5/0263; G01S 5/14; G01S 11/08; G01S 5/00; H04H 20/18; H04L 67/1095; H04L 69/329; H04B 7/18582; H04B 1/713; H04B 1/005
    See application file for complete search history.

(56) References Cited

U.S. PATENT DOCUMENTS

| | | | | |
|---|---|---|---|---|
| 7,120,436 B2* | 10/2006 | Kim | ...................... | H04W 24/02 455/433 |
| 8,063,825 B1 | 11/2011 | Yang | ...................... | G01S 5/0072 342/458 |
| 8,102,784 B1* | 1/2012 | Lemkin | ...................... | G01S 5/10 370/255 |
| 8,526,305 B2* | 9/2013 | Ramesh | ............ | H04W 52/0206 370/230 |
| 9,143,971 B2* | 9/2015 | Lim | ...................... | H04W 64/00 |
| 9,277,446 B2* | 3/2016 | Gimeno Monge | .... | H04B 15/06 |
| 10,015,769 B1* | 7/2018 | Younis | .................. | H04W 64/00 |
| 10,380,691 B1* | 8/2019 | Smith | ...................... | G06Q 40/08 |
| 10,462,762 B2* | 10/2019 | Hollar | ...................... | G01S 11/08 |
| 2001/0053699 A1 | 12/2001 | McCrady | ................ | G01S 5/021 455/513 |
| 2002/0097182 A1 | 7/2002 | Goren | ...................... | G01S 1/026 342/357.4 |
| 2002/0155845 A1 | 10/2002 | Martorana | | |
| 2004/0196185 A1* | 10/2004 | Eft | ........................ | G01S 5/0226 342/458 |
| 2005/0002481 A1* | 1/2005 | Woo | ........................ | G01S 11/08 375/354 |
| 2005/0159152 A1* | 7/2005 | Tice | .................. | H04W 52/0216 455/432.1 |
| 2006/0125693 A1* | 6/2006 | Recker | ...................... | G01S 5/14 342/458 |
| 2006/0203762 A1 | 9/2006 | Taubenheim | ........... | H04L 41/00 370/328 |
| 2006/0215581 A1 | 9/2006 | Castagnoli | .......... | H04L 41/0663 370/254 |
| 2008/0200180 A1* | 8/2008 | Dunn | .................... | H04W 88/06 455/456.1 |
| 2010/0062788 A1* | 3/2010 | Nagorniak | ............ | H04W 48/04 455/456.1 |
| 2010/0304708 A1 | 12/2010 | McCrady | .............. | G01S 5/0205 455/404.2 |
| 2011/0138035 A1* | 6/2011 | Dahl | .................... | G01S 5/0289 709/224 |
| 2011/0153269 A1* | 6/2011 | Lavache | ................... | G01S 5/06 702/152 |
| 2012/0039310 A1* | 2/2012 | Dahl | .................... | G01S 5/0289 370/338 |
| 2012/0165012 A1* | 6/2012 | Fischer | ...................... | G01S 5/10 455/435.1 |
| 2012/0172054 A1* | 7/2012 | Waters | .................... | G01S 19/46 455/456.1 |
| 2013/0072217 A1 | 3/2013 | Zhang | ..................... | G01S 5/021 455/456.1 |
| 2014/0171025 A1* | 6/2014 | Graube | ..................... | G01S 5/06 455/411 |
| 2014/0315578 A1* | 10/2014 | Su | .............................. | G01S 5/10 455/456.2 |
| 2015/0003479 A1* | 1/2015 | Shenoi | .................. | H04J 3/0661 370/503 |
| 2015/0029053 A1* | 1/2015 | Dewberry | ............... | G01S 11/02 342/118 |
| 2015/0105097 A1* | 4/2015 | Sun | ...................... | H04W 64/006 455/456.1 |
| 2015/0134558 A1* | 5/2015 | Murray | .............. | G06Q 10/0833 705/333 |
| 2015/0134559 A1* | 5/2015 | Murray | .............. | G06Q 10/0833 705/333 |
| 2015/0156746 A1* | 6/2015 | Horne | .................... | G01S 5/0226 455/456.6 |
| 2015/0185309 A1* | 7/2015 | Pu | .............................. | G01S 5/06 455/456.1 |
| 2015/0201309 A1 | 7/2015 | Liu | ........................ | H04W 4/025 455/456.1 |
| 2016/0014693 A1 | 1/2016 | Patil | .................... | H04L 12/1881 370/254 |
| 2016/0044600 A1* | 2/2016 | Kim | .................... | H04W 52/325 455/127.1 |
| 2016/0047886 A1* | 2/2016 | Schaffner | .............. | G01S 5/0284 455/456.1 |
| 2017/0363431 A1* | 12/2017 | Colmagro | .......... | G01C 21/3415 |
| 2018/0049147 A1 | 2/2018 | Chen | ...................... | H04W 56/00 |
| 2018/0132199 A1 | 5/2018 | Zhang | ................ | H04W 56/001 |
| 2018/0267132 A1* | 9/2018 | Wang | ...................... | H04W 24/08 |
| 2020/0045608 A1* | 2/2020 | Calcev | ...................... | H04W 40/28 |

FOREIGN PATENT DOCUMENTS

WO    WO 2007/101169 A1    9/2007
WO    WO 2010/006198 A2    1/2010

OTHER PUBLICATIONS

Notification Concerning Transmittal of International Preliminary Report on Patentability, PCT/US2016/061083, dated May 24, 2018, 5 pages.
Extended European Search Report, EP 16864892.1, dated Jun. 14, 2019, 11 pages.

* cited by examiner

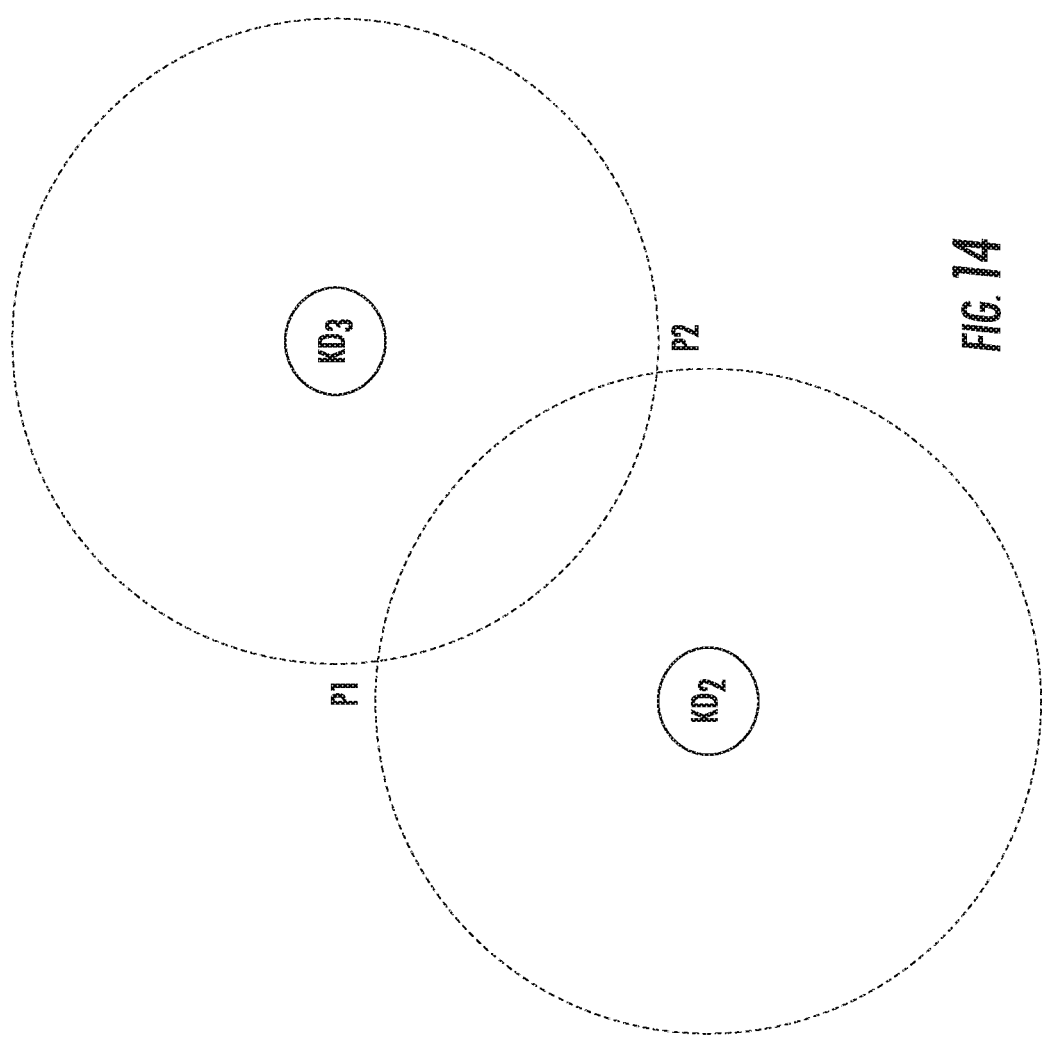
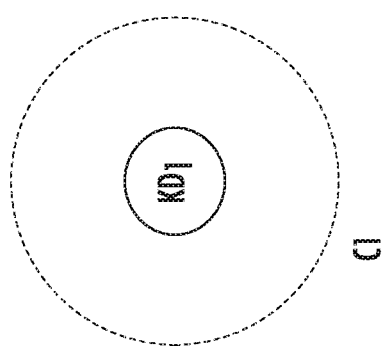
FIG. 14

METHODS FOR DETERMINING LOCATION OF UNKNOWN DEVICES IN A SYNCHRONIZED NETWORK AND RELATED SYSTEMS

CLAIM OF PRIORITY

The present application is a continuation of U.S. patent application Ser. No. 15/767,522, filed Apr. 11, 2018, which is a United States National Phase Application of PCT/US2016/061083, filed Nov. 9, 2016, which claims priority to United States Provisional Application Ser. No. 62/252,753, filed Nov. 9, 2015, the contents of which are hereby incorporated herein by reference as if set forth in their entirety.

STATEMENT OF GOVERNMENT SUPPORT

This invention was made with government support under contract number 2013-33610-21531 awarded by United States Department of Agriculture (USDA). The United States Government has certain rights in this invention.

FIELD

This present inventive concept relates generally antennas and, more particularly, to ultra-wideband antennas and related elements.

BACKGROUND

In the early 2000s, ultra-wideband (UWB) was cited as a promising technology as "wireless universal serial bus (USB)". However, the market turned in a different direction. Nonetheless, the groundwork from the Federal Communications Commission (FCC) was laid so that devices could operate legally in the United States and abroad. Until recently, UWB devices operating in the 3.1 to 10 GHz range tended to be composed of discrete components having a relatively high price point. Recently, however, UWB integrated circuit (IC) chips have come into the marketplace allowing for lower cost UWB transceivers to be built and sold. With the lower price point, these devices may reach a broader audience with greater manufacturing quantities.

Inherent in UWB technology is the ability to create narrow pulse widths. These pulse widths can be used to establish an arrival time of a radio frequency (RF) signal with very high granularity. A precise timestamp can be determined for receiving a signal and transmitting a signal. When timestamps are compared for a message that is sent from one device to the next, a distance between devices can be calculated based on the difference in time and the speed of the signal through the air.

For determining location using Time-difference-of-Arrival, the devices typically need to be synchronized to a master clock. Conventional devices use cable based timing systems or a form of a wireless synching solution to address the synchronization issue.

SUMMARY

Some embodiments of the present inventive concept provide methods for synchronizing multiple transceivers to a single master clock, the method including broadcasting a message from a master device, the broadcasted message including a device identification number identifying the master device to at least one known device within range of the master device; receiving the message at the at least one other known device and recording a time of arrival ($T_{arrival-kd}$) at the at least one other known device; repeatedly broadcasting and receiving messages and recording associated times of arrival at the at least one other known device; and applying a fit curve to the recorded arrival times to estimate a time of an event.

In further embodiments, the fit curve may be applied to two recorded arrival times.

In still further embodiments, the fit curve may be applied to more than two arrival times.

In some embodiments, the broadcast message may include a time of transmission ($T_{depart-md}$).

In further embodiments, both the master device and at least one known device may be radio frequency devices configured to send data at a precise time and record a timestamp of received data within a certain degree of precision.

In still further embodiments, the method may further include rebroadcasting the message from the at least one known device, the message including the transmitted time stamp in the master device time units; and receiving, at a device that is out of RF range of the master device, such that the device that is out of range is synchronized to the master device even when out of RF range using the at least one known device as an intermediate master broadcaster.

In some embodiments, the method may further include rebroadcasting the message including the transmitted time stamp in master device time units from device that is out of RF range; receiving the rebroadcasted message at a second device that is out of RF range of the master device; and synchronizing the second device that is out of RF range by using the device that is out of RF range as an intermediate master broadcaster.

In further embodiments, the method may further include receiving a broadcast time synchronization signal at the at least one known device from a plurality of master devices; and applying a weighting algorithm to the plurality of signals to determine an arrival time of the message.

In still further embodiments, the method may further include applying a weighting algorithm comprises averaging.

Some embodiments of the present inventive concept provide a known device in a network including a plurality of known devices and a master device, the known device includes a receiver configured to receive a broadcast message from a master device that is broadcast to the plurality of known devices within range of the master device, the broadcast message including a device identification number identifying the master device; and a processor configured to: record a time of arrival ($T_{arrival-kd}$) of the broadcast message at the known device, wherein the receiver receives a plurality of broadcast messages and the processor records a time of arrival for each of the plurality of broadcast messages; and apply a fit curve to the recorded arrival times to estimate a time of an event.

Further embodiments of the present inventive concept provide a system including a plurality of devices synchronized to a single master clock, the system including a plurality of known devices including a processor; and a master device configured to broadcast a message, the broadcasted message including a device identification number identifying the master device to at least one of the plurality of known devices within range of the master device; wherein the at least one of the plurality of known devices receives the broadcasted message and records a time of arrival ($T_{arrival-kd}$); wherein the master device is configured to repeatedly broadcast messages; and wherein the at least one of the plurality of known devices is configured to receive the messages and record associated times of arrival and apply a fit curve to the recorded arrival times to estimate a time of an event.

BRIEF DESCRIPTION OF THE DRAWINGS

FIG. 14 is a diagram illustrating KDs and methods in accordance with some embodiments of the present inventive concept will be discussed.

DETAILED DESCRIPTION

Figure 1:
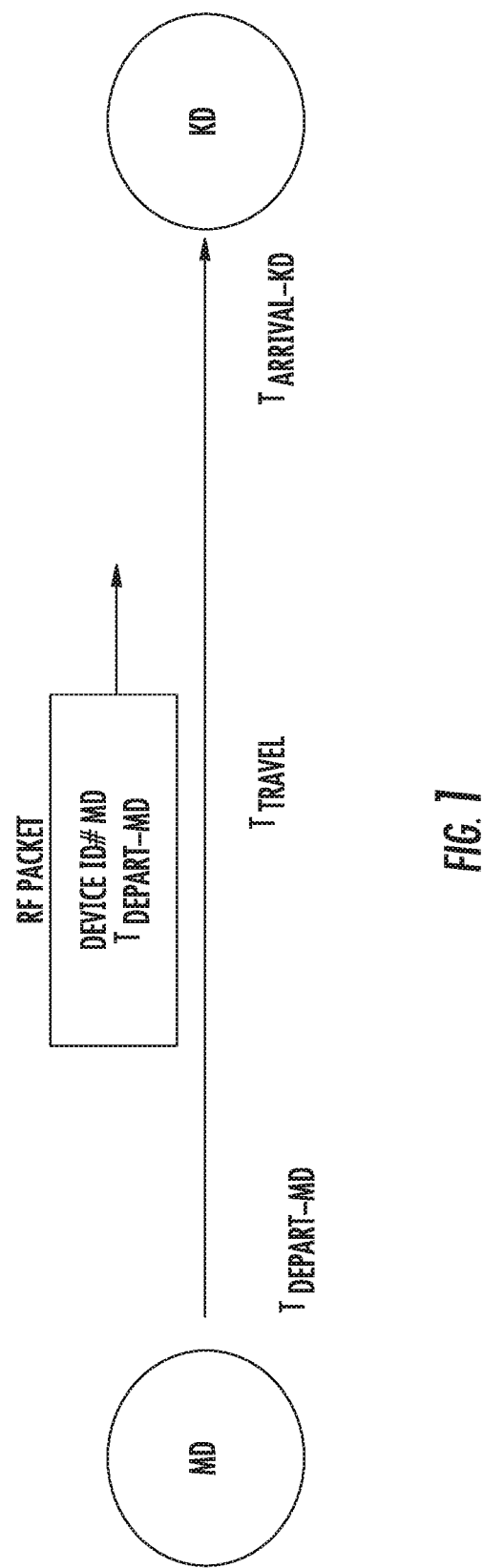
FIG. 1 is a block diagram illustrating synchronizing devices in accordance with some embodiments of the present inventive concept.

The present inventive concept will be described more fully hereinafter with reference to the accompanying figures, in which embodiments of the inventive concept are shown. This inventive concept may, however, be embodied in many alternate forms and should not be construed as limited to the embodiments set forth herein.

Accordingly, while the inventive concept is susceptible to various modifications and alternative forms, specific embodiments thereof are shown by way of example in the drawings and will herein be described in detail. It should be understood, however, that there is no intent to limit the inventive concept to the particular forms disclosed, but on the contrary, the inventive concept is to cover all modifications, equivalents, and alternatives falling within the spirit and scope of the inventive concept as defined by the claims. Like numbers refer to like elements throughout the description of the figures.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to another element, there are no intervening elements present. As used herein the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art to which this inventive concept belongs. It will be further understood that terms used herein should be interpreted as having a meaning that is consistent with their meaning in the context of this specification and the relevant art and will not be interpreted in an idealized or overly formal sense unless expressly so defined herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Although some of the diagrams include arrows on communication paths to show a primary direction of communication, it is to be understood that communication may occur in the opposite direction to the depicted arrows.

Although embodiments of the present inventive concept are directed to UWB devices, it will be understood that embodiments of the present inventive concept are not necessarily limited thereto. Other radio frequency bands that can take advantages of inventive concepts discussed herein may be used without departing from the scope of the present inventive concept. For example, embodiments of the present inventive concept may be used by any device capable of including time-stamps as discussed herein.

As discussed above, ultra-wide band (UWB) radio frequency (RF) technology enables RF transmitters and receivers to send and receive signals at precise times. UWB technology can be leveraged for real time location systems using Time-of-Flight (ToF) and Time-difference-of-Arrival (TdoA) technologies. However, synchronization between devices is critical in some of these applications. Thus, some embodiments of the present inventive concept provide both methods to synchronize multiple UWB transceivers so that they all refer to a master clock and to determine location based on the synchronization of these devices as will be discussed below with respect to FIGS. 1 through 15.

Figure 8:
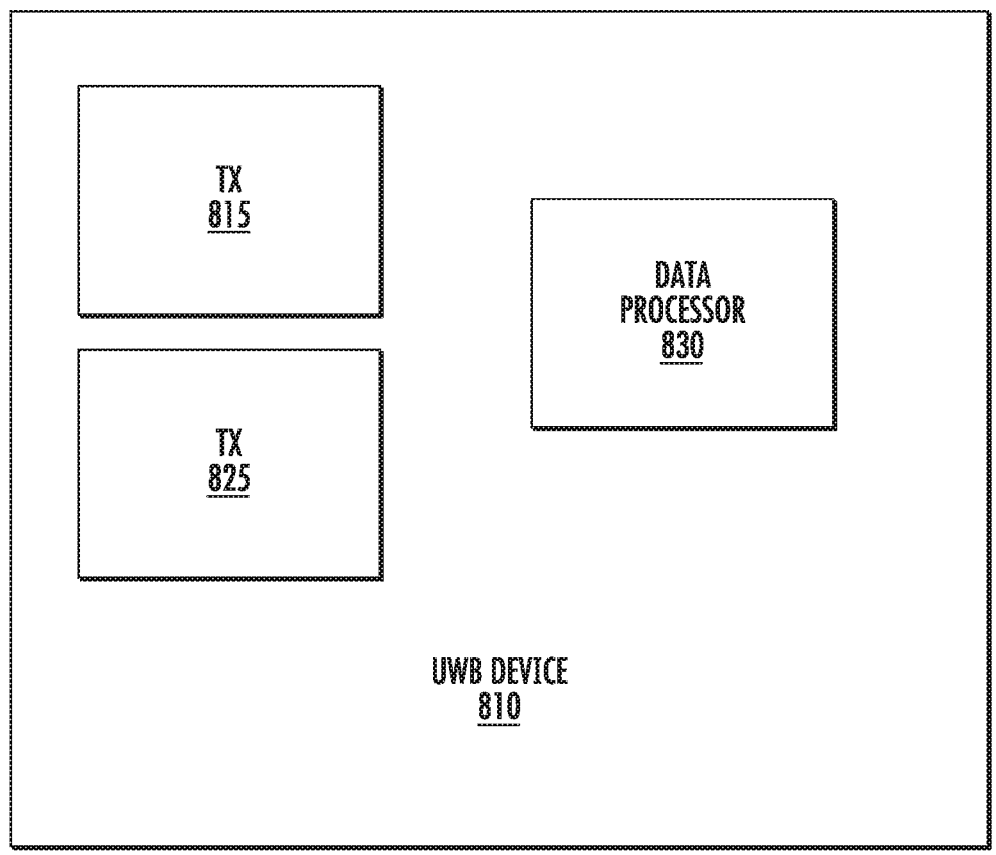
FIG. 8 is a block diagram illustrating an example UWB device in accordance with some embodiments of the present inventive concept.
Figure 9:
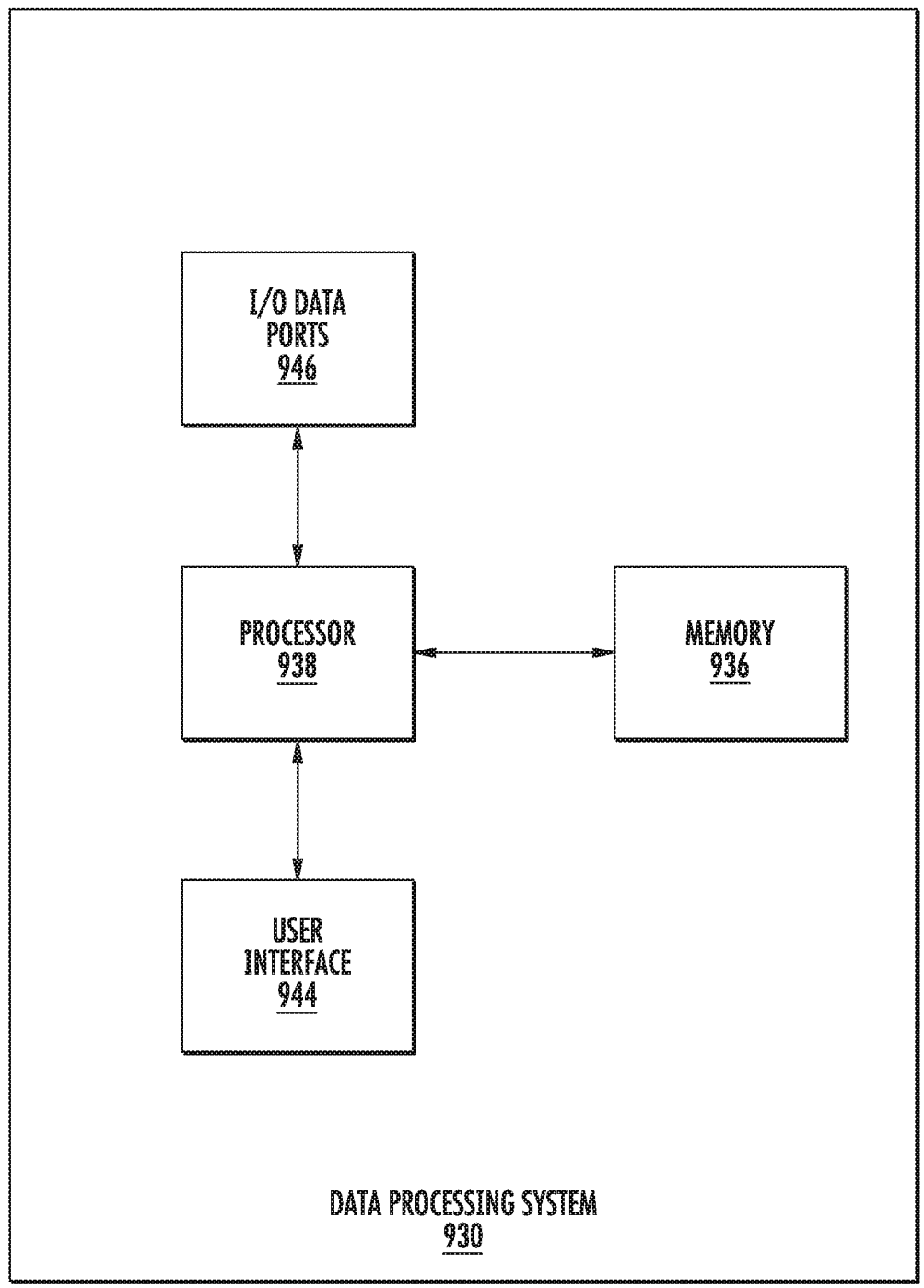
FIG. 9 is a block diagram of a data processing system in accordance with some embodiments of the present inventive concept.

Inherent in UWB technology is the ability to create very narrow pulse widths. These pulse widths can be used to establish an arrival time of an RF signal with very high granularity. Some embodiments of the present inventive concept provide methods for synchronizing timing of multiple UWB capable devices for the purpose of Real Time Location Systems (RTLS). As illustrated in FIG. 8, as used herein, a "UWB device" includes a UWB transmitter 825 and receiver 815 and a data processor 830 that includes means to start a transmission at a precise predetermined time and means to determine the time with very high precision of the time an RF message is received. It will be understood that additional elements can be included in the UWB device without departing from the scope of the present inventive concept. As will be discussed herein, multiple devices together can provide a solution for determining not only distance from one device to another, but an exact x,y,z position (location).

UWB Devices can be described as either being known devices (KD) or unknown devices (UD). In particular, a known device is a device whose location is known. An unknown device is a device whose location is not known.

In some embodiments of the present inventive concept, devices are configured to self-calibrate. Given the devices ability to measure timestamps and consequently measure distances, the devices may be programmed to determine location automatically in accordance with some embodiments of the present inventive concept. Furthermore, devices in accordance with embodiments discussed herein can also calibrate their crystals using timestamps such that optimum signal-to-noise reception may be achieved.

Referring now to FIG. 1, a diagram illustrating methods for synchronizing devices directly communicating with the master device (MD) in accordance with some embodiments of the present inventive concept will be discussed. Referring now to FIG. 1, known devices (KDs) are distributed throughout an area. KDs have the ability to communicate over UWB directly or by message hopping to other devices. A known device (KD) is selected as the master device (MD) illustrated in FIG. 1. The other known devices (KDs) can be synchronized to the selected (MD). As used herein, "synchronized" means that for any given point of time (otherwise called an "event") that happens or will happen in the future, a KD can directly convert from MD clock units to its KD clock units and vice versa. For example, for an event time described in MD clock units, $T_{event-md}$, the KD can calculate the event time in KD clock units, $T_{event-kd}$. Similarly, for an event time defined by a KD clock unit, $T_{event-kd}$, the KD can calculate the event time in MD clock units, $T_{event-md}$.

It will be understood that although FIG. 1 illustrates a single MD and a single KD, embodiments of the present inventive concept are not limited to this configuration. As will be discussed below, more than one MD and/or KD can be present without departing from the scope of the present inventive concept. Thus, in theory there could be an unlimited number of devices transmitting and receiving (listening) without departing from the scope of the present inventive concept.

As illustrated in FIG. 1, the MD sends out a broadcast (RF packet). A broadcast is an RF message that does not necessarily have a single intended receiver. Multiple devices could receive the same broadcast message. The message includes the MD identifier number (Device id #MD). In some embodiments, the broadcast message includes the time at which the broadcast started transmission, $T_{depart-md}$ as illustrated in FIG. 1.

In some embodiments, the $T_{depart-md}$ may not be included in the message. In these embodiments, $T_{depart-md}$ is already defined and known by the receiving devices beforehand. Note that $T_{depart-md}$ is described in MD clock units.

As illustrated, a KD within listening range receives the RF packet that is broadcast and records the arrival time in its own clock units, $T_{arrival-kd}$. The time it takes the RF signal to travel from the MD to the KD is $T_{travel}$. Typically, $T_{travel}$ is so small and the difference in timing between the clocks of the MD and KD is so small that it is not necessary specify whether $T_{travel}$ is measured from the MD or the KD. In some embodiments, they are assumed to be identical.

In some embodiments, $T_{travel}$ may be calculated as follows. Since typically all KDs' locations are known, the distance between the MD and KD (D md-to-kd) can be calculated as follows:

$$D_{md-to-kd} = T_{travel} \times c \qquad \text{Eqn. (1)}$$

where c is the speed of light.

In some embodiments, $T_{travel}$ may be calculated using time-of-flight (ToF) methods between the MD and KD. The arrival time $T_{arrival-md}$ in MD clock units is calculated based on the travel time $T_{travel}$ and the departure time $T_{depart-md}$ as follows:

$$T_{arrival-md} = T_{depart-md} + T_{travel} \qquad \text{Eqn. (2)}$$

The MD sends out periodic broadcasts. The KD receives the periodic broadcasts. The arrival times of the broadcast can be described in a sequence as $T_{arrival-kd-1}$ $T_{arrival-kd-2} \ldots T_{arrival-kd-n}$, where the 1, 2 . . . n subscripts describe the individual broadcasts. As discussed above, the arrival time in MD clock units is calculated by the KD:

$$T_{arrival-md-1} T_{arrival-md-2} \ldots T_{arrival-md-n} \qquad \text{Eqn. (3)}$$

From the sequences above, the arrival times ($T_{arrival-kd-n}$, $T_{arrival-md-n}$) can be used to convert any given time from KD time units to MD time units and vice versa. In some embodiments, just two arrival times are used to do a linear interpolation to convert $T_{event-kd}$ to or from $T_{event-md}$. For example, let Broadcast #1 and Broadcast #2 represent two broadcasts. The equation could be a linear interpolation as follows:

$$T_{event-kd} = (T_{event-md} - T_{arrival-md-1}) \times (T_{arrival-kd-2} - T_{arrival-kd-1})/(T_{arrival-md-2} - T_{arrival-md-1}) + T_{arrival-kd-1} \qquad \text{Eqn. (4)}$$

In some embodiments, the pair ($T_{event-md-n}$, $T_{event-kd-n}$) can be considered ($x_n, y_n$) data points and ($T_{event-md-i}$, $T_{event-kd-i}$) are considered known points on the x-y graph ($x_i$, $y_i$). Using the points ($x_i$, $y_i$), a fitting function is created (y=F(x)) to calculate $T_{event-kd}$. Alternatively, a fitting function (x=G(y)) may also be used to calculate $T_{event-md}$. In some embodiments, the fitting function could be a polynomial equation of the n-th degree. At least n+1 broadcasts would be needed to calculate an n-th degree polynomial equation. However, it will be understood that embodiments of the present inventive concept are not limited to this fitting function.

It should be noted that the following expression, $M_{slope}$, is very nearly equal to 1 for MD and KD clocks that are very close in frequency:

$$M_{slope} = (T_{arrival-kd-2} - T_{arrival-kd-1})/(T_{arrival-md-2} - T_{arrival-md-1}) \qquad \text{Eqn. (5)}$$

For clocks that differ by just a few parts per million or less, $M_{slope}$ may have a value of 1.000001. Depending on the representation of this value within the processor, there is a risk that the processor could truncate the small portion and interpret $M_{slope}$ as just "1". Alternatively, this would necessitate moving to a 16-, 32-, or 64-bit floating point type significantly increasing the processing of the calculations. Rearranging Eqn. (4) and introducing the following terms, $T_{dif}$ and $T_{period\text{-}md}$ mitigates truncation error in the calculations. Furthermore, all values can be represented as integers. $T_{dif}$ is the difference in MD time units versus KD time units for the period of time between the arrivals of successive message packets to the KD. For closely aligned clocks, $T_{dif}$ will be very small. $T_{period\text{-}md}$ represents the period of time between successive departures of the MD. There is just one multiplication and one division as illustrated below.

$$T_{dif} = (T_{arrival\text{-}kd\text{-}2} - T_{arrival\text{-}kd\text{-}1}) - (T_{arrival\text{-}md\text{-}2} - T_{arrival\text{-}md\text{-}1}) \quad \text{Eqn. (6)}$$

$$T_{period\text{-}md} = T_{depart\text{-}md\text{-}2} - T_{depart\text{-}md\text{-}1} \quad \text{Eqn. (7)}$$

$$T_{event\text{-}kd} - T_{event\text{-}md} = T_{dif} = (T_{event\text{-}md} - T_{arrival\text{-}md\text{-}2})/T_{period\text{-}md} + (T_{arrival\text{-}kd\text{-}2} - T_{arrival\text{-}md\text{-}2}) \quad \text{Eqn. (8)}$$

In some embodiments, $T_{period\text{-}md}$ is represented by a number that is a fixed power of 2. For example, $T_{period\text{-}md}$ can be $2^{16}$. In doing division as in Eqn. (5) within a microcontroller, this changes a long division calculation with a shift operation and can reduce the number of microcontroller (MCU) instruction cycles for time critical activities.

Figure 2:
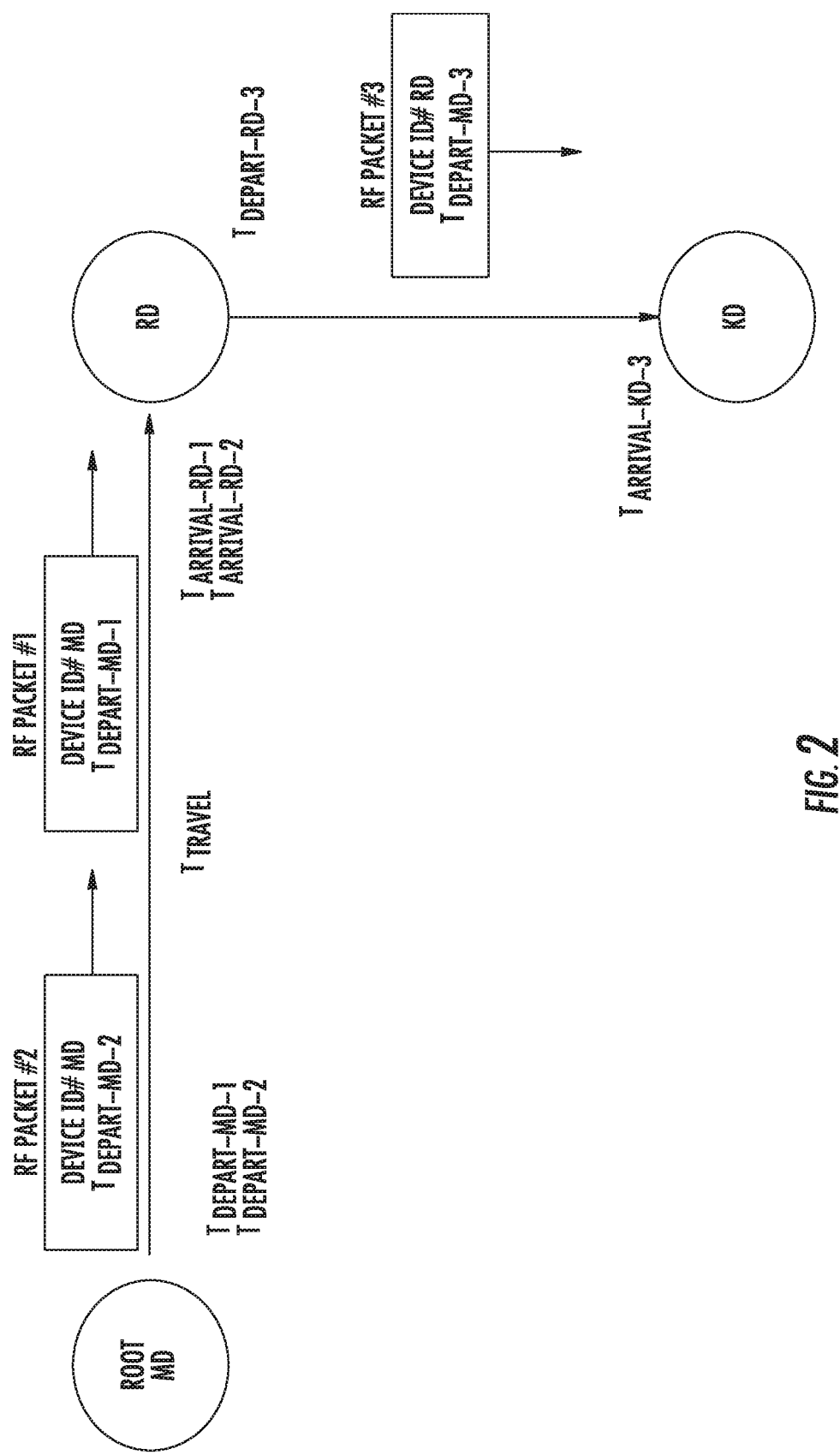
FIG. 2 is a block diagram illustrating synchronizing devices through a single rebroadcast in accordance with some embodiments of the present inventive concept.

Referring now to FIG. 2, a diagram illustrating methods for synchronizing devices with the master device using a single rebroadcast will be discussed. Methods discussed above with respect to FIG. 1 and Eqns. (1)-(8) can be used to synchronize all KDs within RF range of the MD. The RF range can vary depending on distance or RF barriers (i.e. metallic walls). For Federal Communications Commission (FCC) 15.250 standards that range could vary from anywhere below 50 feet to above 1000 ft. Methods discussed with respect to FIG. 2 are directed towards how the other KDs not within RF range to the MD can synchronize to the master device.

A KD is chosen to be the Rebroadcast Device (RD). The RD is synchronized with the MD, referred to in FIG. 2 as the root MD. The RD is in communication range with some subset of KDs that are not directly communicating with the master device. This subset of KDs plus the RD will be called the subnet.

Referring to methods discussed above with respect to FIG. 1, the RD becomes a master device (MD) of the subnet. Further, the RD uses the root MDs departure time within the broadcasts. As illustrated in FIG. 2, the broadcasts from the root MD to the RD are the same as those discussed above with respect to FIG. 1. Broadcasts #1 and #2 (RF packets #1 and #2) are sent from the root MD to the RD. Using methods discussed above with respect to FIG. 1, the RD is synchronized to the root MD. The RD sends broadcast #3 (RF packet #3) to the KD. $T_{depart\text{-}rd\text{-}3}$ is the departure time of broadcast #3 in RD time units. Based on methods discussed above with respect to FIG. 1, RD calculates $T_{depart\text{-}md\text{-}3}$ from $T_{depart\text{-}rd\text{-}3}$. The packet of Broadcast #3 contains the departure time in the root MD time units, $T_{depart\text{-}md\text{-}3}$. Once the broadcast packet is received from the KD, the KD has $T_{depart\text{-}md\text{-}3}$ in MD time units. The calculations from Eqn. (1) to Eqn. (4) can then be used to synchronize the KD directly to the root MD even though the KD is not directly communicating to the root MD. In some embodiments, $T_{depart\text{-}md\text{-}3}$ is known by KD a-priori and there is no need to include the time, $T_{depart\text{-}md\text{-}3}$, within the packet of Broadcast #3.

Figure 3:
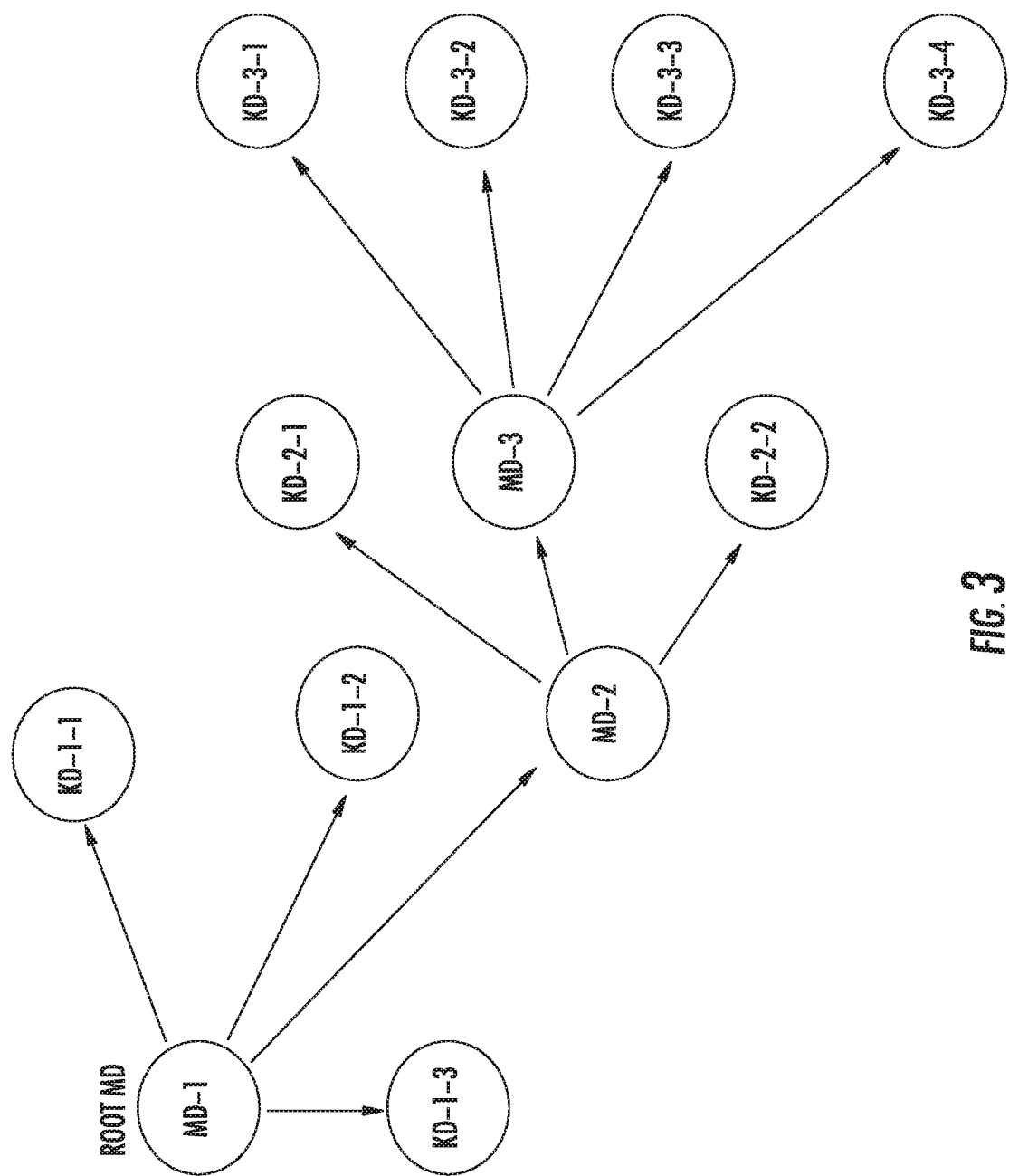
FIG. 3 is a block diagram illustrating synchronizing devices through multiple rebroadcasts in accordance with some embodiments of the present inventive concept.

Referring now to FIG. 3, a diagram illustrating methods for synchronizing devices with the master device using multiple rebroadcasts will be discussed. As discussed above with respect to FIG. 1, there can be subnets of subnets such that every KD has at least one local MD with which it can directly communicate. All the MDs can communicate with one another either directly or through message hopping.

FIG. 3 depicts an example network. The root MD is labeled MD-1. As illustrated in FIG. 3, MD-1 first synchronizes with KD-1-1, KD-1-2, MD-2, and KD-1-3. Once synchronized, MD-2 rebroadcasts the messages, and uses the MD-1 time units when rebroadcasting. MD-2 rebroadcasts to KD-2-1, MD-3 and KD-2-2 so that they can be synchronized with MD-1. Likewise, since MD-3 is synchronized to MD-1, it can broadcast messages, and use MD-1 time units when broadcasting. Then, KD-3-1, KD-3-2, KD-3-3, KD-3-4 become synchronized to MD-1. Thus, all the devices are synchronized to the root MD in accordance with some embodiments discussed herein.

Figure 4:
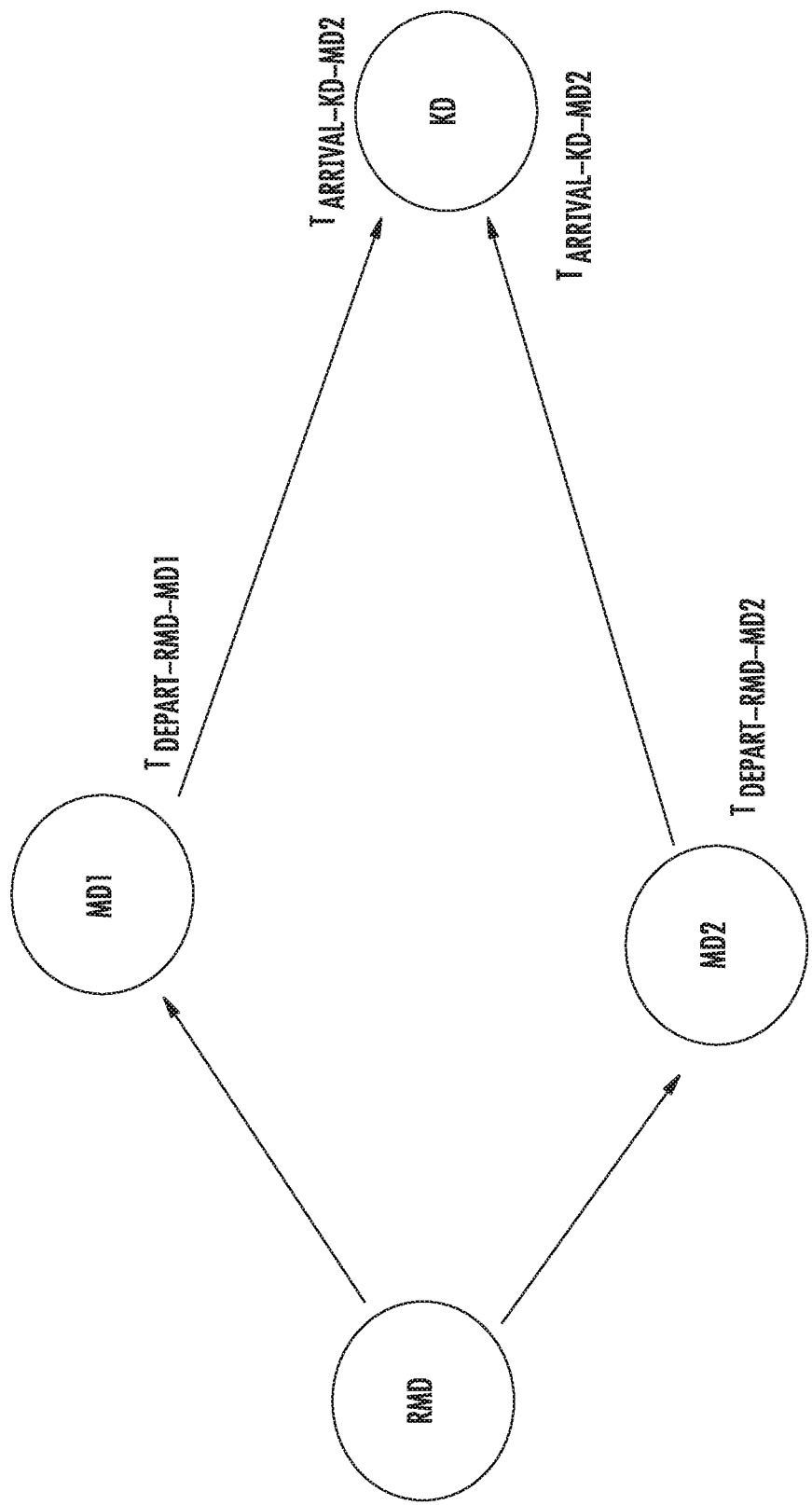
FIG. 4 is a block diagram illustrating synchronizing devices using averaging in accordance with some embodiments of the present inventive concept.

Referring now to FIG. 4, a diagram illustrating methods of Synchronizing using averaging will be discussed. As illustrated in FIG. 4, a KD can receive broadcasts from two or more MDs. In FIG. 4, the KD receives a broadcast from MD1 and MD2, both of which are synchronized to the root MD (RMD). In some embodiment, the KD uses the broadcasts coming from just one of the MDs, either MD1 or MD2, and discards broadcasts from the other. This is similar to methods discussed above with respect to FIG. 3.

In some embodiments, the KD uses the broadcasts from both devices. $T_{depart\text{-}rmd\text{-}md1}$ represents the departure time coming from MD1 in RMD time units. $T_{depart\text{-}rmd\text{-}md2}$ represents the departure time coming from MD2 in RMD units. Adjusting for the travel time, $T_{travel}$, as was discussed above with respect to Eqn. (2), the KD will have two arrival times from both MDs in both RMD units and in KD units. These can be expressed in (x,y) pairs as follows: $(T_{arrival\text{-}kd\text{-}md2}, T_{arrival\text{-}rmd\text{-}md2})$ and $(T_{arrival\text{-}kd\text{-}md1}, T_{arrival\text{-}rmd\text{-}md1})$, where $T_{arrival\text{-}kd\text{-}md1}$ represents the arrival time in KD units of the broadcast from MD1 and $T_{arrival\text{-}rmd\text{-}md1}$ represents the arrival time in RMD units of the broadcast from MD1.

As additional broadcasts come in from both MDs, the KD can use the (x,y) pairs to do curve fitting as discussed above with respect to FIG. 1. By using curve fitting, event times in both KD units and RMD units can be calculated. As used herein, "curve fitting" refers to the determination of a curve that fits a specified set of points. In particular, curve fitting is the process of constructing a curve, or mathematical function, that has the best fit to a series of data points, possibly subject to constraints. Curve fitting can involve either interpolation, where an exact fit to the data is required, or smoothing, in which a "smooth" function is constructed that approximately fits the data. One common method to curve fitting is the Least Squares method, however, embodiments of the present inventive concept are not limited thereto.

In some embodiments, the KD can calculate two separate $T_{event\text{-}kd}$ times: one based off of the broadcasts from MD1 and another based on MD2, $T_{event\text{-}kd\text{-}md1}$ and $T_{event\text{-}kd\text{-}md2}$. A combined $T_{event\text{-}final}$ can be calculated based on the combination of $T_{event\text{-}kd\text{-}md1}$ and $T_{event\text{-}kd\text{-}md2}$. In some embodiments, the mathematical or a weighted mean could produce $T_{event\text{-}final}$. In some embodiments, the weights are chosen based on the estimated accuracy of each of the $T_{event\text{-}kd}$ times. The present inventive concept is not restricted to using just weighted averaging as a method to determine $T_{event\text{-}final}$. In some embodiments, KD may receive broadcasts from three or more MDs.

Figure 5:
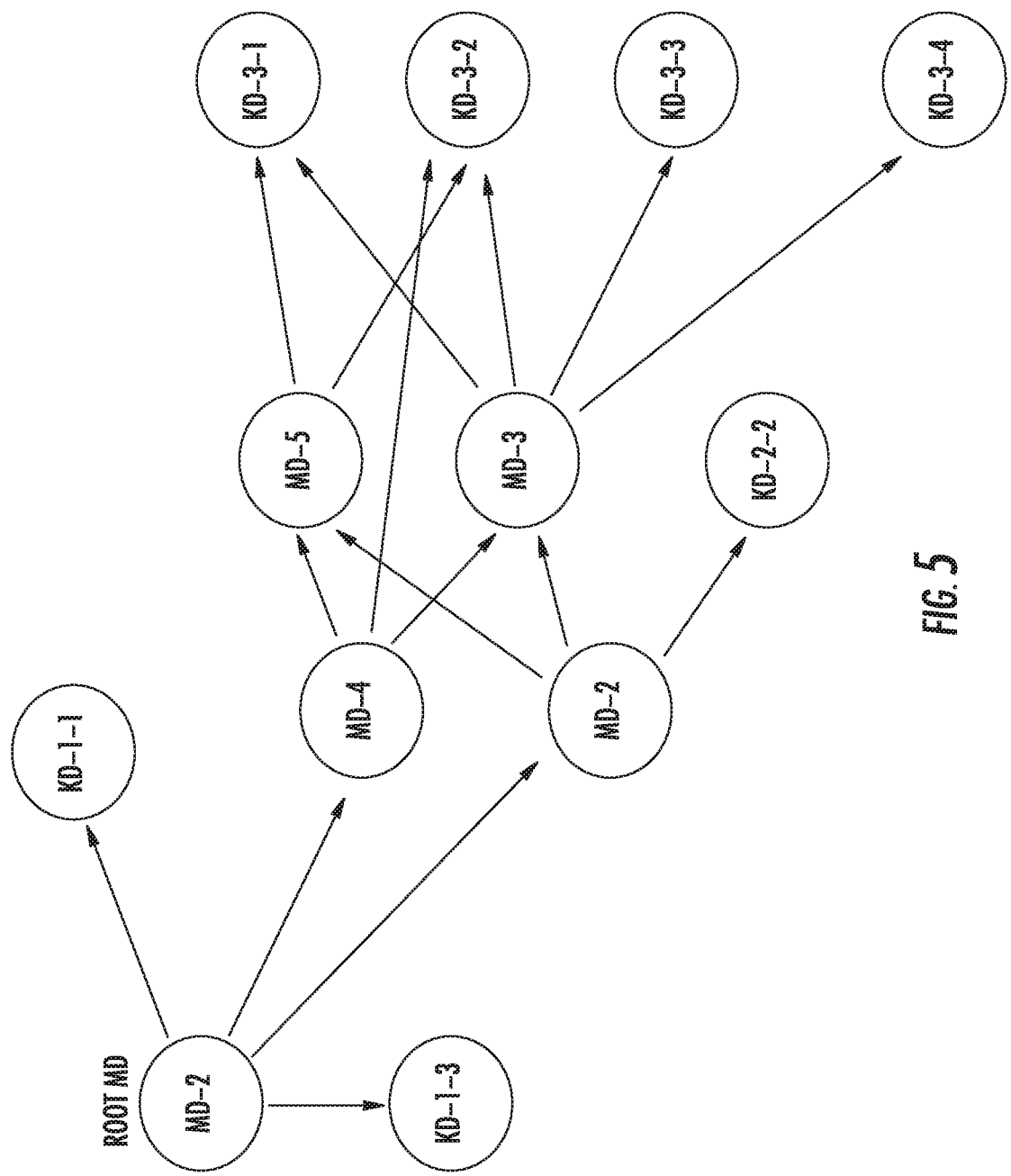
FIG. 5 is a block diagram illustrating synchronizing devices through multiple rebroadcasts and averaging in accordance with some embodiments of the present inventive concept.

Referring now to FIG. 5, extrapolating the process discussed above with respect to FIG. 4 further, this method works when the KD receives broadcasts from three or more MDs just as well as for two. FIG. 5 illustrates multiple rebroadcasts and averaging of the received signals. The Root MD is MD-1. MD-4 and MD-2 are synchronized with MD-1 directly using methods discussed above with respect to FIG. 1. MD-5 and MD-3 both receive rebroadcasts from MD-4 and MD-2, respectively. Using methods discussed with respect to FIG. 4, these devices are synchronized to MD-1. Likewise, the situation similarly plays out for KD-3-1, which receives rebroadcasts form MD-5 and MD-3. KD-3-2 receives rebroadcasts from three other KDs, MD-5, MD-4, and MD-3. KD-3-2 may use a curve fitting algorithm discussed with respect to FIG. 4 with data from the three KDs to determine synchronization.

In a situation where the known devices (KD) have unfettered access to power, they can remain on all the time listening and transmitting as needed. In these embodiments, the fixed devices stay on most or all the time, and the unknown devices (UD) turn on briefly to transmit a broadcast message, but do not necessarily listen to a response.

Figure 6:
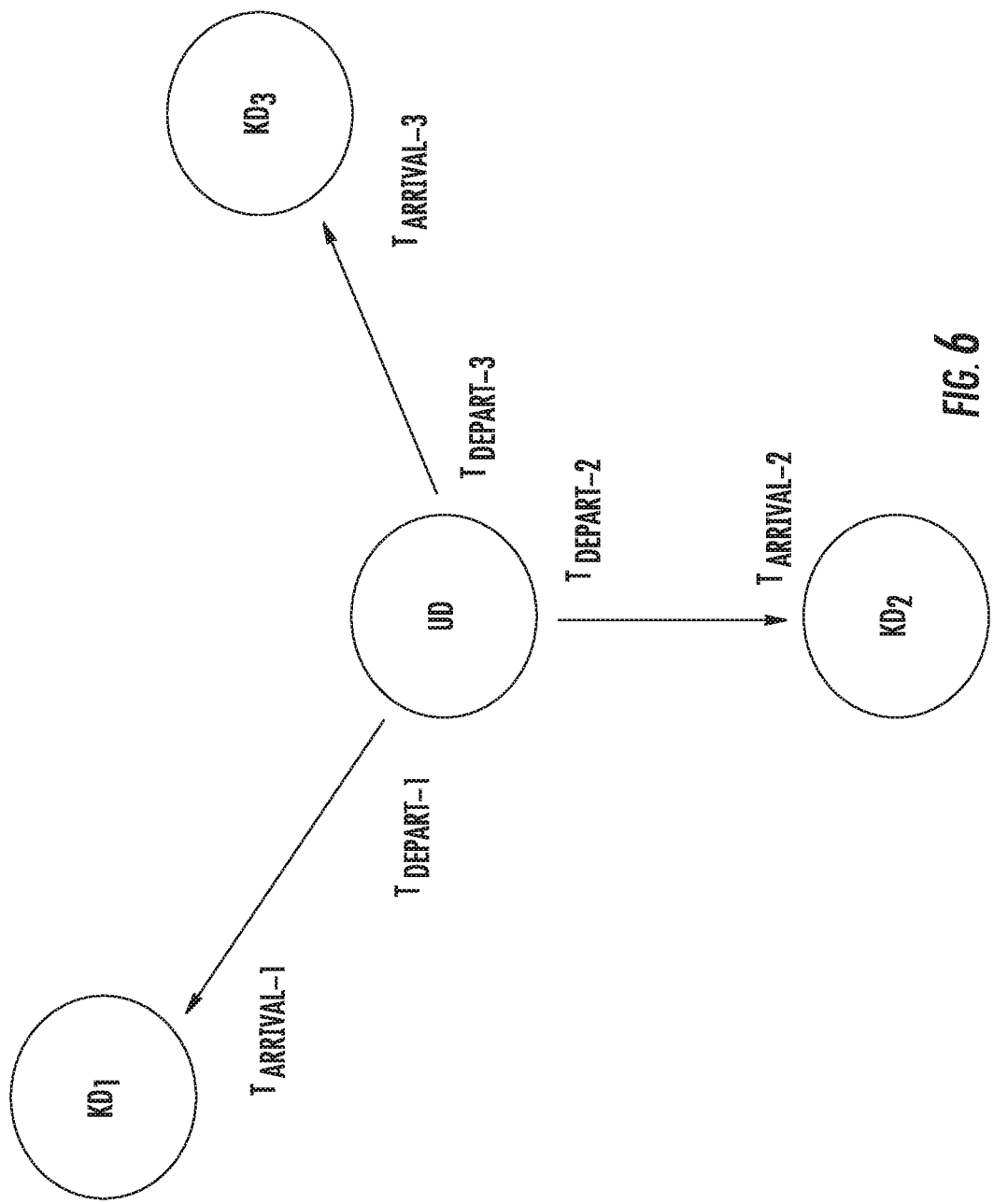
FIG. 6 is a block diagram illustrating calculating location in accordance with some embodiments of the present inventive concept.

Referring now to FIG. 6, a diagram illustrating methods for calculating location when the unknown device transmits a ping will be discussed. FIG. 6 illustrates an example of one unknown device, UD, with three known devices (KD). Assume multiple KDs (denoted individually with a numbers $KD_1$, $KD_2$, and $KD_3$) synchronize their clock with a master clock using previously described methods to resynchronize clocks; a UD broadcasts to all listening KDs; and KDs record the arrival time of the ping ($T_{arrival-i}$).

The algorithm to determine location based on time stamps using these assumptions will be discussed below. An initial guess of the x,y and z location called $L_{guess}$ will be determined. In some embodiments, a two dimensional solution could be sought which would only require x and y, but no z. For purposes of simplicity herein, the three dimensional solution will be discussed, however, it will be understood that the methods are also suitable for two dimensions.

A distance, $D_i$, is calculated from $L_{guess}$ to each $KD_i$ using the following equation:

$$D_i = \text{sqrt}((x-x_i)^2 + (y-y_i)^2 + (z-z_i)^2) \qquad \text{Eqn. (9)}$$

The travel time based on the speed of light, $T_i = D_i/c$ (c is the speed of light, $t_i$ is the travel time from the UD to $KD_i$) is calculated. The departure time of the broadcast based on each stationary device's arrival time is calculated as follows:

$$T_{depart-i} = T_{arrival-i} - T_i \qquad \text{Eqn. (10)}$$

Under ideal circumstances, if the initial guess is correct and there are no timing errors, the $T_{depart-i}$ times will all be substantially the same. However, if it is not the case, the error among the $T_{depart-i}$ is calculated.

$$T_{avg} = \text{mean}(T_{depart-i}) \qquad \text{Eqn. (11)}$$

where $T_{avg}$ is the average of all the $T_{depart-i}$. The Error function is represented by the following equation:

$$F_{Error} = \Sigma(T_{avg} - T_{depart-i})^2 \qquad \text{Eqn. (12)}$$

A suitable value of $L_{guess}$ will make $F_{Error}$ have a minimum value, for example, $L_{guess}$ could be the average of all the KDs location and represent the location of the remote device. A variety of iterative methods can be used to determine the minimum. For example, the gradient descent method can be used as an iterative method to determine the minimum. The gradient descent method uses a negative gradient of the function to find the fastest decrease in the error. Amending $L_{guess}$ based on the gradient descent method and iterating steps discussed above with respect to FIG. 6 will approach a solution. Once a minimum error is reached, a solution may be found. Not only is the x,y,z location of the UD determined, but the time the original broadcast was transmitted ($T_{depart-true}$) is $T_{avg}$ of the final iteration.

Although embodiments of the present inventive concept illustrated in FIG. 6 discussed having three KDs, embodiments of the present inventive concept are not limited to this configuration. For example, less than or more than three KDs may be present without departing from the scope of the present inventive concept.

Figure 7:
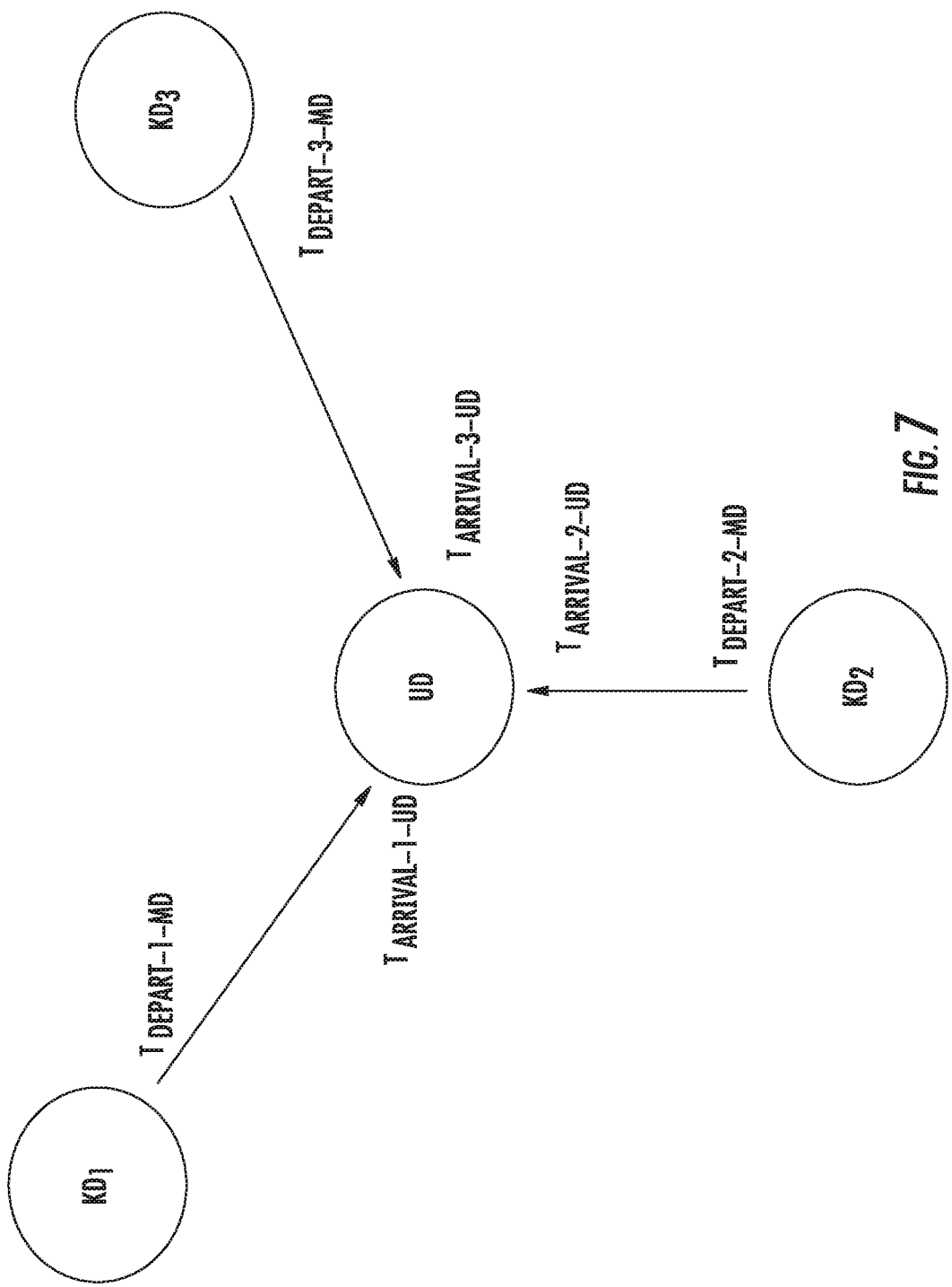
FIG. 7 is a block diagram illustrating calculating location in accordance with some embodiments of the present inventive concept.

Methods for calculating location when all known devices broadcast will now be discussed. These methods may be very similar to the methods discussed above with respect to FIG. 6. One difference is that all the KDs transmit broadcasts, and the unknown device receives those broadcasts. FIG. 7 illustrates an example of three KDs broadcasting to one listening UD. Steps for determining location will now be discussed.

Using methods to resynchronize clocks discussed above, all KDs are synchronized to a root MD. All KDs periodically broadcast a message. In some embodiments, the departure time of the broadcast in MD clock units, $T_{depart-i-md}$, is embedded within the broadcast message. In some embodiments, $T_{depart-i-md}$ is known or communicated to the UD outside of the broadcast message. Furthermore, the broadcast message contains either the identifier of the KD and/or the location coordinates of the KD. The UD records the arrival time stamp, $T_{arrival-i-ud}$, for each received broadcast. An initial guess ($L_{guess}$) of the UD's x,y,z location is determined. In some embodiments, the method may be applied in two dimensions where the guess only uses x and y coordinates as discussed above.

The distance, $D_i$, from the UD to the other KDs may be calculated $D_i = \text{sqrt}((x-x_i)^2 + (y-y_i)^2 + (z-z_i)^2)$ using Eqn. (9) discussed above. The travel time is based on the speed of light, $T_i = D_i/c$ (c is the speed of light, $t_i$ is the travel time from the UD to $KD_i$) as discussed above. The departure time of the broadcast from $KD_i$, $T_{depart-i-ud}$, is calculated as according to Eqn. (10). The offset, $T_i$, between the MD master clock and the clock of the UD is calculated as follows:

$$T_{offset-i} = T_{depart-i-ud} - T_{depart-i-md} \qquad \text{Eqn. (13)}$$

Under ideal circumstances, if the initial guess is correct and there are no timing errors, the $T_{offset-i}$ times will all be substantially the same. This assumes that the clock frequencies of the UD and the MD are also nearly the same. The error among the $T_{offset-i}$ is calculated as follows:

$$T_{avg} = \text{mean}(T_{offset-i}) \qquad \text{Eqn. (14)}$$

where $T_{avg}$ is the average of all the $T_{depart-I}$ and the Error function is represented as follows:

$$F_{Error} = \Sigma(T_{avg} - T_{offset-i})^2 \qquad \text{Eqn. (15)}$$

A suitable value of $L_{guess}$ will make $F_{Error}$ have a minimum value and represent the location of the remote device. A variety of iterative methods can be used to determine the minimum. For example, the gradient descent method can be used as an iterative method to determine the minimum. The gradient descent method uses a negative gradient of the function to find the fastest decrease in the error. Amending $L_{guess}$ based on the gradient descent method and iterating operations discussed above will approach a solution. Once a minimum error is reached, a solution may be found. Not only is the x,y,z location of the UD determined, but the offset time of the UD to the MD is also calculated as $T_{avg}$ of the final iteration.

Methods for calculating location when UD's and MD's clock frequency is slightly off will be discussed. Methods discussed above are used when the UD's and MD's clock frequency is nearly the same or does not offer appreciable difference over the time that the UD receives the broadcasts. In embodiments where this is not the case, these differences should be accounted for. Thus, unlike discussed above, $T_{offset-i}$ would not be nearly the same for all $KD_i$s, but instead can be modeled as a linear relationship. $T_{calculated-offset-i}$ is the calculated value of $T_{offset-i}$ when suitable values for $T_{offset-const}$ and $K_{clock-dif}$ are chosen as illustrated in the following equation:

$$T_{calculated-offset-i} = T_{offset-const} + T_{depart-i-md} \times K_{clock-dif} \quad \text{Eqn. (16)}$$

The difference between the $T_{offset-i}$ and its associated calculated value $T_{calculated-offset-i}$ represents the error that is fed into the error function:

$$F_{Error} = T_{calculated-offset-i} - T_{offset-i} \quad \text{Eqn. (17)}$$

Thus, in Eqns. (13) and (14) a modified error function where $T_{avg}$ is replaced with $T_{calculatedoffset-i}$ will be used as illustrated below:

$$\text{Error function}, F_{Error} = \Sigma (T_{calculated-offset-i} - T_{offset-i})^2 \quad \text{Eqn. (18)}$$

There is more than one way to choose values for $T_{offset-const}$ and $K_{clock-dif}$. In some embodiments, $T_{offset-const}$ and $K_{clock-dif}$ are chosen such that the $T_{calculated-offset-i}$ values are most closely related to $T_{offset-i}$. In some embodiments, since $T_{offset-const}$ and $K_{clock-dif}$ can be treated as variables in the error function, $F_{error}$. $T_{offset-const}$ and $K_{clock-dif}$ can be iterated upon just as the x,y, z variables are iterated upon as discussed above.

Methods for calculating location based on time-of-flight with synchronized devices will now be discussed. In some embodiments, using a highly precise, stable clock for both the MD's clock and the UD's clock, the devices can remain synchronized for a long period of time. Once synchronized, a direct calculation of distance can be done. In other words, the UD is synchronized to the MD, so when the UD receives a broadcast, $T_{arrival-i-md}$ can be calculated directly from $T_{arrival-i-ud}$ as illustrated by the following equation:

$$D_{from-i-to-UD} = (T_{arrival-i-md} - T_{depart-i-md}) \times C_{speed-of-light} \quad \text{Eqn. (19)}$$

where $D_{from-i-to-UD}$ represents the calculated distance from $KD_i$ to UD and $C_{speed-of-light}$ is the speed of light constant.

In some embodiments, most of the KDs do not have access to ample supply of power. They remain off most of the time. In these embodiments, devices turn on briefly to do a synchronized broadcast of their positions and then quickly turn off. To accomplish this, in some embodiments of the present inventive concept all KDs are programmed to turn on at some specific internal time. Initially they are all synchronized to turn on at or nearly at the same time. When turned on, the KDs perform any of the methods discussed above to synchronize their times. Furthermore, while they are on, each KD transmits a broadcast at a specific time. The broadcast message can include, for example, the x,y,z location of the KD; and the departure time of the broadcast message. In some embodiments, the message does not contain the x,y,z location, but instead includes a unique ID of the KD such that the KD's location could be looked up through an alternate means.

Once synchronized, the KDs sleep until a predefined time in which they wake up and repeat the above described method. During this process, a UD will receive the broadcasts from various KDs. The MD departure time, $T_{depart-i-md}$, is embedded in the broadcast message. The UD will have captured the arrival times stamp, $T_{arrival-i-ud}$. Therefore, the UD's location can be determined using the methods discussed above.

In some embodiments, the mobile device sleeps during the same period as the stationary devices to conserve power.

In some embodiments of the present inventive concept, a highly precise clock may be used for the MD device, which may further reduce the timing error of the entire system. An example of a highly precise clock could be an atomic clock whose precision is orders of magnitude better than that of a crystal oscillator.

To conserve power, most KDs may only turn on to receive a broadcast message and then rebroadcast it. The master clock device however stays on while other devices may sleep so precise timing can be maintained even while the devices are sleeping.

As discussed above, $T_{offset-const}$ and $K_{clock-dif}$ may be calculated and can be used to synchronize the UD with the MD. If the UD and MD both have highly precise clocks, for example, atomic clocks, then the UD can stay synchronized over a long period. When the clock of the UD is already synchronized to the MD, any received broadcasts and their associated transmit and receive timestamps can be used to calculate these values without the need to use TdoA algorithms discussed above. Instead, fewer devices are needed to calculate location based on a direct distance calculation as follows:

$$\text{Distance} = (T_{arrival-md} - T_{depart-md}) \times C_{speed-of-light} \quad \text{Eqn. (20)}$$

Using triangulation methods, as few as 2 KDs are typically needed to determine x and y location coordinates and as few as 3 KDs are needed for x, y, and z. This compares favorably to TdoA which typically needs one more device to determine location.

As discussed above, ultra-wide band RF technology enables RF transmitters and receivers to send and receive signals at precise times. UWB technology can be leveraged for real time location systems using Time-of-Flight and Time-difference-of-Arrival technologies. However, synchronization between devices is critical in some of these applications. Thus, some embodiments of the present inventive concept provide both methods to synchronize multiple UWB transceivers so that they all refer to a master clock and to determine location based on the synchronization of these devices.

As discussed above, methods are described to determine the location of UDs. However, once the location of UD is known, it can also be used as a KD and contribute to the pool of KDs used to synchronize and determine location of other UDs. For slowly moving or stationary UDs over a period of time, these UDs can be considered quasi-static. "Moving slowly" is relative, because the UDs are only required to not move appreciably during the period of time they serve as KDs. If the period of time is small, the UDs actually can move quite quickly and still serve as KDs.

As discussed above, some aspects of the present inventive concept may be implemented by a data processing system. The data processing systems may be included in any of the devices discussed herein without departing from the scope of the present inventive concept. For example, the data processing system may be included in the MD and/or KD. Exemplary embodiments of a data processing system 930 configured in accordance with embodiments of the present inventive concept will be discussed with respect to FIG. 9. The data processing system 930 may include a user interface 944, including, for example, input device(s) such as a keyboard or keypad, a display, a speaker and/or microphone, and a memory 936 that communicate with a processor 938. The data processing system 930 may further include I/O data port(s) 946 that also communicates with the processor 938. The I/O data ports 946 can be used to transfer information between the data processing system 930 and another computer system or a network using, for example, an Internet Protocol (IP) connection. These components may be conventional components such as those used in many conventional data processing systems, which may be configured to operate as described herein.

As discussed above, the memory 936 can include data such as clock and location (x,y,z) information. However, it will be further understood that the memory 936 may further include data signaling errors, or alerts, and other status data. The memory 936 may be accessed for database storage of location data for historical record, and analytics program operations of that data and other transmitted data, for improved decision-making. Thus, the memory is not limited to just clock and location information.

In some embodiments of the inventive concept, the system may also apply a weighting algorithm to arrival and departure time and distance data of each KD to determine location from any of the methods described in this inventive concept. For example, with a priori knowledge of approximate location, a KD to UD RF transmission that has a direct path that goes through walls or thick metallic barriers may not be weighted as much as those KD's that are within the same room as the UD with a clear line of sight. Further, measured parameters such as the received "Total Signal Power", "First Path Signal Power", and/or the "First Path Power Ratio" could all be used in weighting the importance of the KD's measured data in the localization algorithms. Further, the system could be calibrated beforehand to determine the relative importance of each KD's data based on location. An example of such a calibration could include taking measurements of a moving device with the stationary KDs in a variety of different locations. Depending how close the measured data of each KD was per location, an appropriate weighting metric could be applied.

Figure 10:
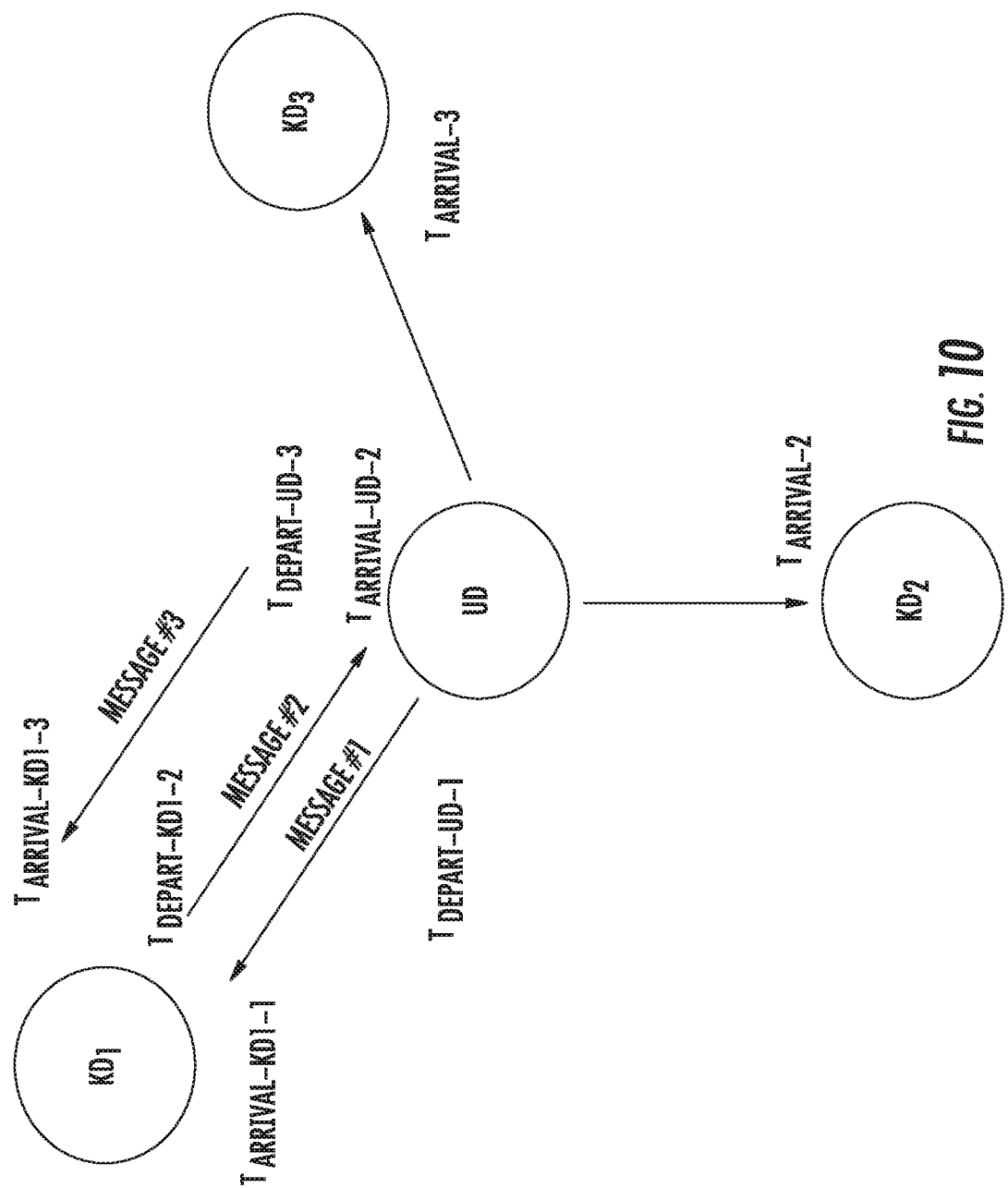
FIG. 10 a diagram illustrating methods for calculating location in accordance with some embodiments of the present inventive concept will be discussed.

Referring now to FIG. 10, a hybrid time-of-flight and time difference of arrival method in accordance with some embodiments of the present inventive concept will be discussed. Methods illustrated in FIG. 10 build on the time synchronization solution by merging Time-of-Flight (two way ranging) with Time Difference of Arrival to determine location of a device. FIG. 10 is a diagram illustrating methods for calculating location when the unknown device (UD) transmits a ping and uses two-way ranging. As illustrated in FIG. 10, the example includes one unknown device (UD) with three known devices (KD). Assume multiple KDs (denoted individually with a numbers $KD_1$, $KD_2$, and $KD_3$) synchronize their individual clocks with a master clock using methods to resynchronize clocks discussed above; a UD broadcasts to all listening KDs; and each of the KDs records the arrival time of the ping ($T_{arrival-i}$). Methods discussed above with respect to FIG. 6 discuss location determination with the UD transmitting a single ping. In these methods, the UD transmits a single ping and then communicates with one of the KDs to further determine localization.

Viewing messages passed to and from the UD and KD1, there are three total messages. All timestamps are local to the device itself. It is well known that in sending three messages and recording timestamps that a time-of-flight between the two devices value can be calculated. For example, Message 1 is the message sent from the UD to KD1 with timestamps of $T_{depart-UD-1}$ and $T_{arrival-KD-1}$. Message #2 is sent from KD1 to UD and has local timestamps of $T_{depart-KD1-2}$ and $T_{arrival-UD2}$. Finally, Message #3 is sent from UD to KD1 and has local timestamps $T_{depart-UD-3}$ and $T_{arrival-KD1-3}$. Therefore the time it takes to travel from one device to the next can be described as:

$$TOF_{kd1-ud} = [(T_{arrival-UD-2} - T_{depart-UD-1}) - (T_{depart-KD1-2} - T_{arrival\_KD1-1}) + (T_{arrival-KD1-3} - T_{depart-KD1-2}) - (T_{depart-UD-3} - T_{arrival-UD-2})]/4 \qquad \text{Eqn. (21)}$$

This method is provided for example only. It will be understood that other methods exist for calculating $TOF_{KD1-UD}$. One assumption in this calculation is that the clock offsets between KD1 and UD are small enough such that $TOF_{kd1-ud}$ can represent a true time independent of clock offsets.

Since $TOF_{kd1-ud}$ is known, then a distance between KD1 and UD can be calculated by the TOF with the speed of light. Further, $TOF_{KD1-UD}$ can be used to calculate the $T_{depart-UD-MD}$ in master device units. Given that the KDs syncronize themselves with an MD, the arrival times of all the devices are recorded as $T_{arrival-KD1-MD}$, $T_{arrival-KD2-MD}$ and $T_{arrival-KD3-MD}$. The departure time of the UD in MD units can then be determined by subtracting the $TOF_{KD1-UD}$:

$$T_{depart-UD-MD} = T_{arrival-KD1-MD} - TOF_{KD1-UD} \qquad \text{Eqn. (22)}$$

Thus, the time of flight for the first message between UD and KD2 and KD2 can also be determined.

$$TOF_{KD2-MD} = T_{arrival-KD2-MD} - T_{depart-UD-MD} \qquad \text{Eqn. (23)}$$

$$TOF_{KD3-MD} = T_{arrival-KD3-MD} - T_{depart-UD-MD} \qquad \text{Eqn. (24)}$$

Distances can be determined, and triangulation algorithms can be used to determine the location of the UD.

The decision with which KD should be chosen to perform TOF with the UD can be made different ways. For example, with some a priori knowledge of approximate location, the KD that is closest to the UD can be chosen. Alternatively, the received signal strength of the KD that is greatest from the initial transmit ping could determine which one to use for TOF. Some transceivers provide the "First Path Signal Power." Further, the ratio of the "First Path Signal Power" to the "Total Signal Power" (First Path Power Ratio) can also be used in determining which KD to perform Time-of-Flight messaging with.

Figure 11:
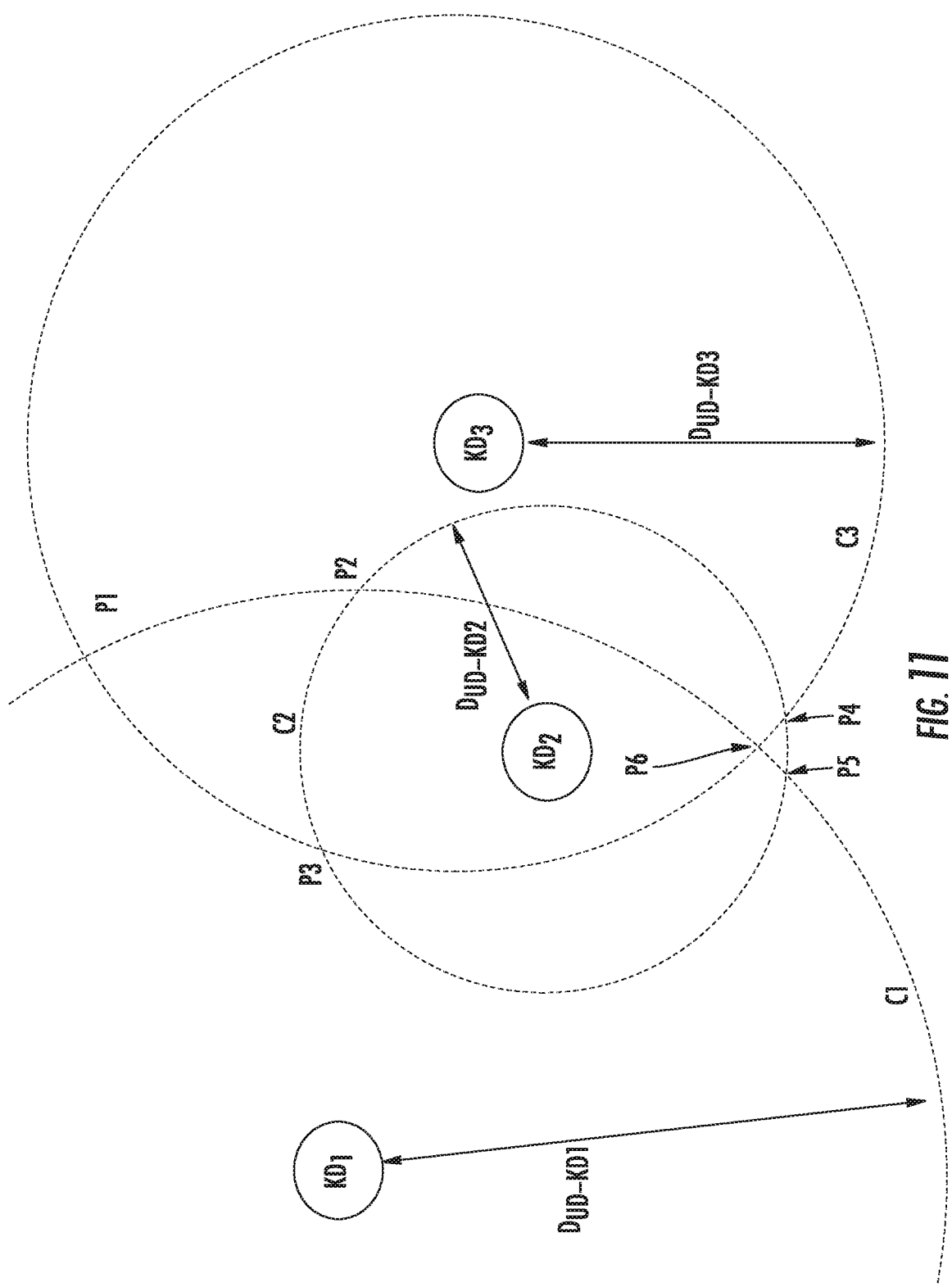
FIG. 11 is a diagram illustrating methods in accordance with some embodiments of the present inventive concept will be discussed.

Referring now to FIG. 11, a point clumping method in accordance with some embodiments of the present inventive concept will be discussed. As illustrated in FIG. 11, there are three KDs ($KD_1$, $KD_2$ and $KD_3$) and one UD (not shown). Using various embodiments of the present inventive concept discussed above, a distance for each KD from the UD can be determined. The three distances are noted on the figure ($D_{UD-KD1}$, $D_{UD-KD2}$, and $D_{UD-KD2}$). Embodiments of the present inventive concept illustrated in FIG. 11 illustrate determining the location of the UD by looking for points close to the UD that are "clumped" together. The circles C1, C2, C3 have radii associated with the distances ($D_{UD-KD1}$, $D_{UD-KD2}$, and $D_{UD-KD2}$) and are each centered at their respective KD. In particular, for each circle pair, two intersection points are determined. For the three KDs, the circle pairs would be C1-C2, C1-C3, and C2-C3 creating points (P2, P5), (P6, P1), and (P3, P4). For each point, the distance, $\Delta_{Pi-Cj}$, that each point (Pi) is from each of the circles (Cj) is measured for all circle point pairs:

$$\Delta_{Pi-Cj} \text{ for points } Pi\{i=1 \text{ to } 6\} \text{ and circles } Cj\{j=1 \text{ to } 3\} \qquad \text{Eqn. (25)}$$

A weighting function, "Func", is applied for each distance, $\Delta_{Pi-Cj}$. For example, a step function may be applied. For $\Delta_{Pi-Cj}$ below a certain threshold, the weight function, "Func" is increased by one (1) point. The sum of the weighting functions is:

$$\text{SumFunc}(Pi) = \text{Func}(\Delta_{Pi-C1}) + \text{Func}(\Delta_{Pi-C2}) + \text{Func}(\Delta_{Pi-C3}) \quad \text{Eqn. (26)}$$

For the greatest SumFunc(Pi) the solution is chosen as Pi.

It will be understood that $\Delta_{Pi-Cj}$ can be directly calculated for a given KDj and Pi as:

$$\Delta_{Pi-Cj} = \text{sqrt}((x_j - x_{Pi})^2 + (y_j - y_{Pi})^2) - D_{UD-KDj} \quad \text{Eqn. (27)}$$

where $(x_j, y_j)$ are coordinates of the KDj, and $(x_{pi}, y_{pi})$ are the coordinates for $P_1$. An example of a weighting function, Func, could be:

$$\text{Func}(\Delta_{Pi-Cj}) = 0 \text{ for abs}(\Delta_{Pi-Cj}) > 1 \text{ meter} \quad \text{Eqn. (28)}$$

$$\text{Func}(\Delta_{Pi-Cj}) = 1 \text{ for abs}(\Delta_{Pi-Cj}) <= 1 \text{ meter} \quad \text{Eqn. (29)}$$

In this example, the SumFunc(Pi) represents the number of points that are within 1 meter of Pi. Thus, the point with the highest number of neighboring points is chosen which represents the points that are most lumped together.

In some embodiments, the weighting function, Func, could also be weighted per KDi by making it dependent on the RF signal strength of a received signal of the KDi. Some transceivers provide the "First Path Signal Power." Further, the ratio of the "First Path Signal Power" to the "Total Signal Power" (First Path Power Ratio) can also be used in the weighting function, Func. For example, a "Func" could be:

$$\text{Func}(\Delta_{Pi-C1}) = 0 \text{ for abs(Dist)} > 1 \text{ meter} \quad \text{Eqn. (30)}$$

$$\text{Func}(\Delta_{Pi-C1}) = R1 \text{ for abs(Dist)} <= 1 \text{ meter} \quad \text{Eqn. (31)}$$

where R1 is the First Path Power Ratio of the received signal from KD1. In this example, some KDs are given greater weight when than other KD is when they have a higher First Path Power Ratio.

An algorithm can also be selective for which circle pairs are used in calculating points. For example, if two KDs have very low "First Path Signal Power", the algorithm may assume that the distances will not be very accurate, and they could be removed from consideration. Alternatively, for a point that has a very high "First Path Power Ratio," the algorithm may require that all pairs need to have said circle as one of the pairs. For example, if KD1 and KD2 have very low First Path Signal Power, but KD3 has a very high "First Path Power Ratio", then points from C1-C2 could be ignored, and only points from C1-C3 and C2-C3 would be considered (i.e. P6, P1, P3, and P4).

Finally, points could be eliminated if they lie outside the area they are expected to be. For example, assume a UD is in a rectangular room mapped to a coordinate system giving the four corners of the room as (0,0) (100,0) (100,100) (0,100). Using the clumped method, two possible points show up as (50,50) and (200,50). It is clear that the point (200,50) can be thrown out because it does not lie in the room. This could also be reflected in the individual weighting functions Func giving it a very low value if the Pi coordinate points are outside of the given area.

Embodiments of the present inventive concept including a point clumping method with time difference of arrival will now be discussed. As discussed above, point clumping may be used when distances are known between the UD and the KDs. In some embodiments, the entire system is synchronized to a master clock. The UD only transmits a ping, and so the system only knows the arrival times, $T_{arrival-KD-MD}$, of the ping from each of the KDs. It does not know the distances.

In some embodiments, the distances, $D_{UD-KDi}$, need to be determined for each KDi-UD pair. For a known departure time, $T_{depart-UD-MD}$, of the UD ping, we have shown that $D_{UD-KDi}$, can be calculated as:

$$D_{UD-KDi} = (T_{arrival-KD1-MD} - T_{depart-UD-MD}) * c_{speed-of-light} \quad \text{Eqn. (32)}$$

where $c_{speed-of-light}$ is the speed of light. Consequently, it follows that for a given departure time, $T_{depart-UD-MD}$, the Point Clumping Method discussed above may be used. Maximizing function SumFunc(Pi) can also be a function of the departure time $T_{depart-UD-MD}$ or $T_{depart}$ for short:

$$\text{SumFunc}(Pi, T_{depart}) \quad \text{Eqn. (33)}$$

If $T_{depart}$ is varied through all possible, reasonable values, a 2D array of SumFunc is determined whose two variables are Pi and $T_{depart}$. Note that Pi is, in itself, a function of $T_{depart}$, since new Pi's are calculated for each value of $T_{depart}$. Pi should ideally be written as Pi($T_{depart}$), but for the case of simplicity, we simply write Pi.

Figure 12:
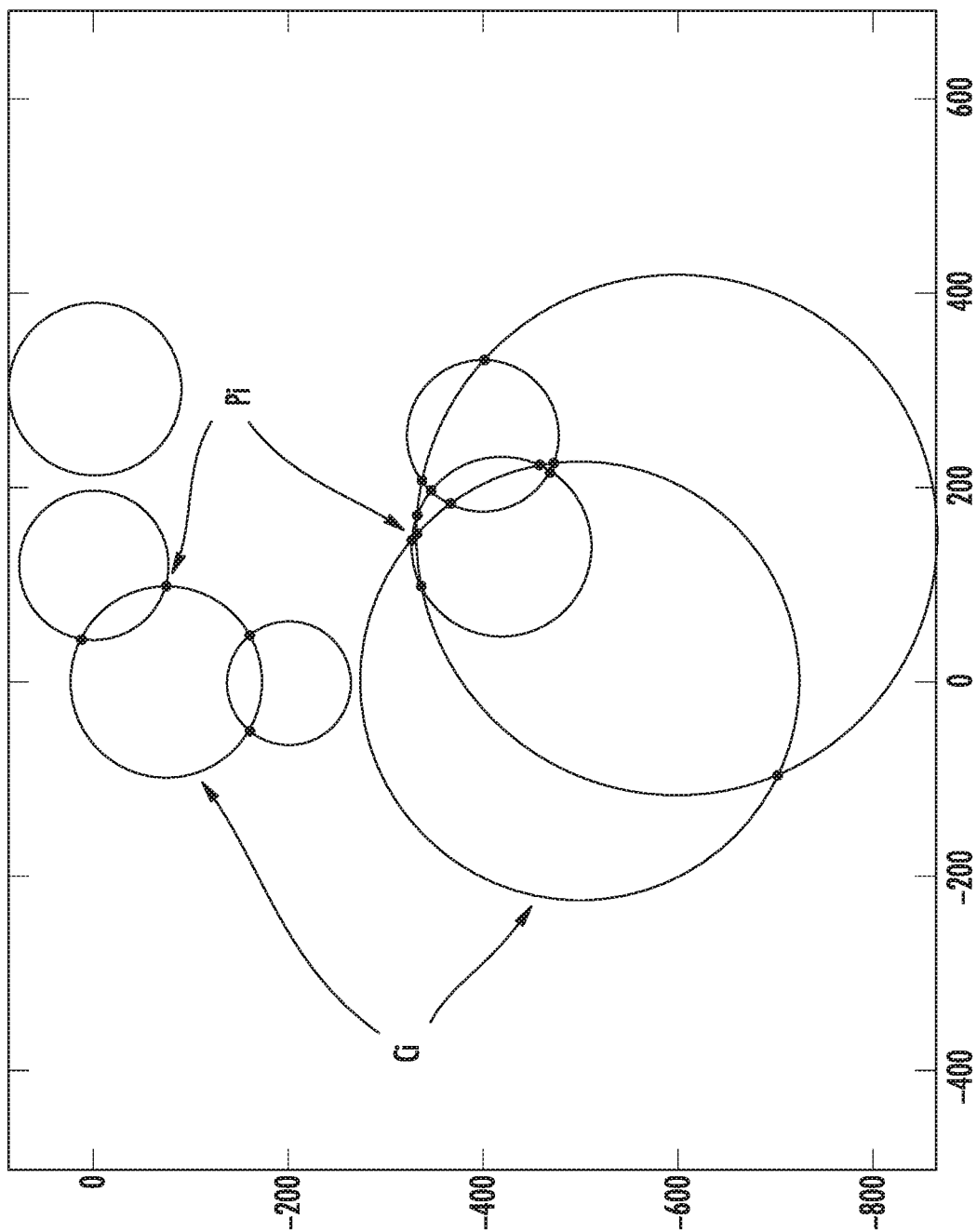
FIG. 12 is a graph illustrating KDs and arrival times in accordance with some embodiments of the present inventive concept.
Figure 13:
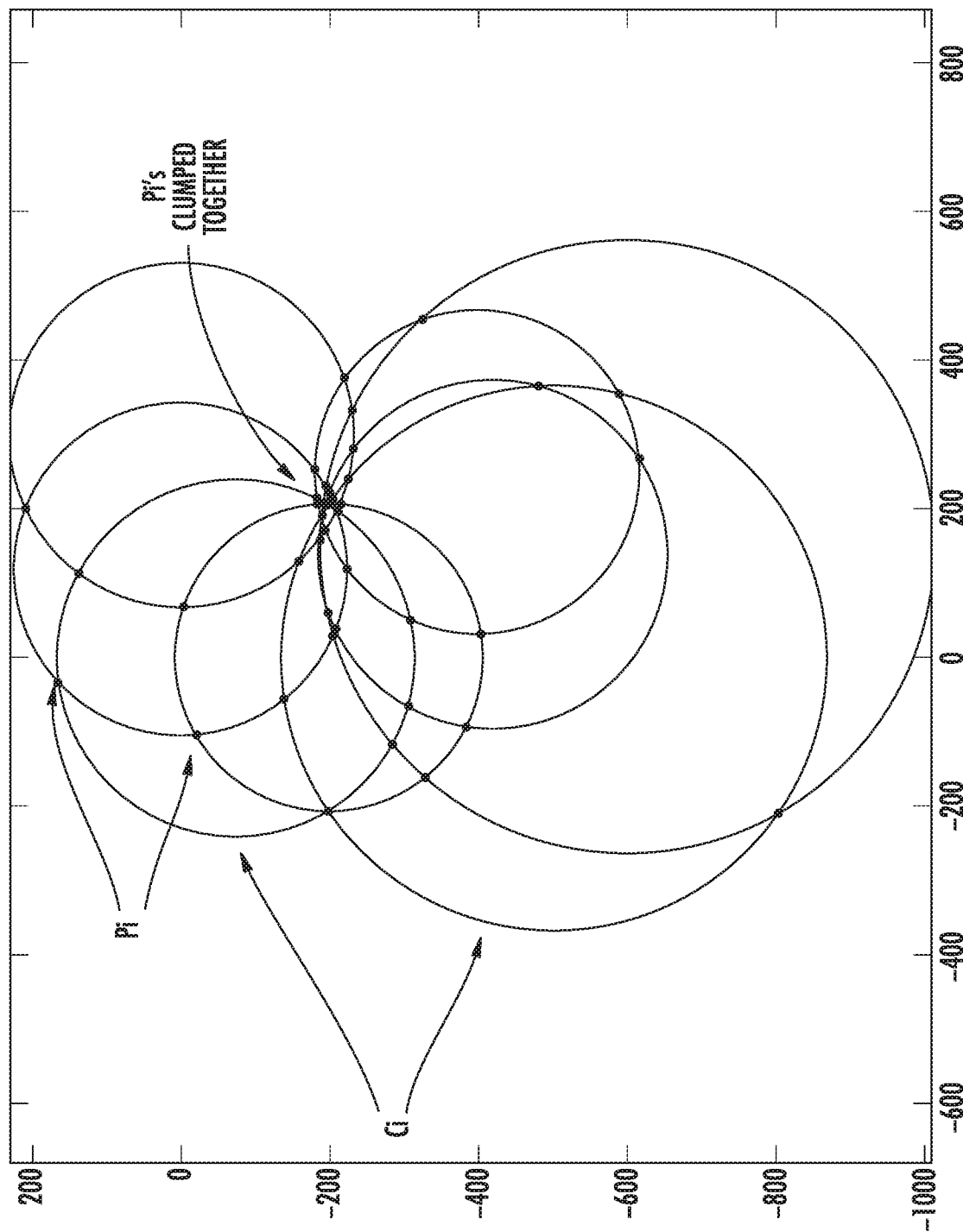
FIG. 13 is a graph illustrating KDs and arrival times in accordance with some embodiments of the present inventive concept.

In these embodiments, there can be a value for Pi and $T_{depart}$ that gives the maximum value of SumFunc. For example, FIGS. 12 and 13 are graphs illustrating the same KDs and arrival times but differing departure times, $T_{depart}$. In FIG. 12, the circle intersections are relatively spread, sparsely distributed throughout the area. In FIG. 13, with $T_{depart}$ set earlier in time, it is clear there is a mass of points clumped together, and consequently, an optimal point is within that set of Pi's. In this manner, the specific values of Pi and $T_{depart}$ that give the maximum value of SumFunc are the solutions to the TDOA localization problem.

It will be understood that the line-of-sight (LOS) time-of-flight (TOF) of a signal is the direct path an RF signal would take to from one point to another. However, this LOS TOF may be equal to or less than the measured TOF of a transceiver. The measured TOF may be a result of a reflection and therefore would be longer in time than a TOF whose signal represented the direct path of the signal. This can be used in helping to aid the localization effort. For example, referring to FIG. 14, assume a $T_{depart}$ is chosen to generate the three distances for the circles. FIG. 14 illustrates three KDs each with their distance circles, C1, C2 and C3. KD2 and KD3 have intersection points of P1 and P2. KD1's circle C1 does not intersect with the other two circles, but also it is not very close to them at all, relatively speaking. Since the LOS TOF is almost always equal to or less than the measured TOF, a realistic scenario would show C1 intersecting or at least coming close to the other two circles. Therefore, on the assumption that this is a physically implausible situation, this value of $T_{depart}$ and all of the associated points, P1 and P2, can be removed from consideration as a solution.

Figure 15:
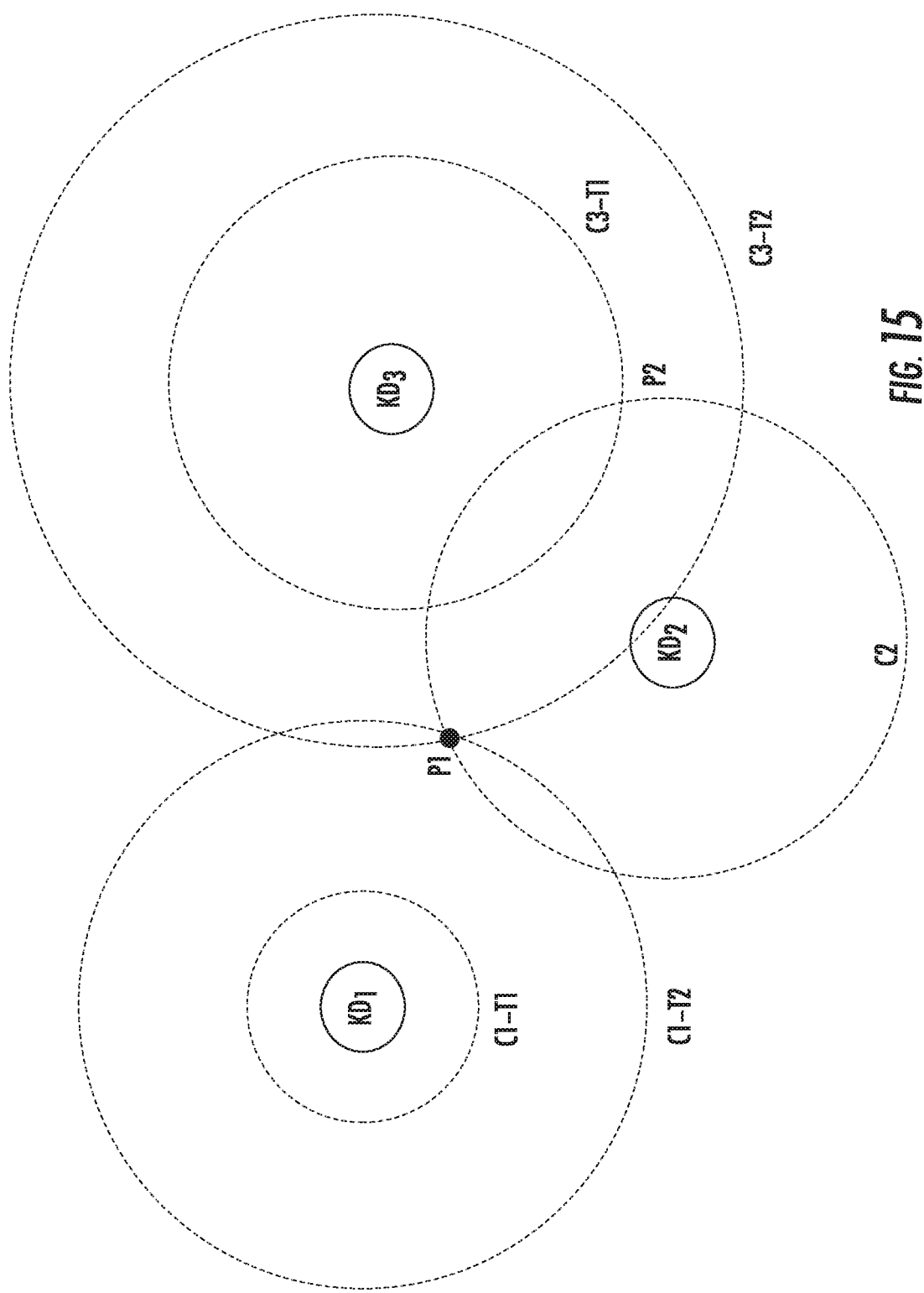
FIG. 15 is a diagram illustrating KDs and methods in accordance with some embodiments of the present inventive concept will be discussed.

Referring now to FIG. 15, a hybrid point clumping method will be discussed. In embodiments illustrated in FIG. 15, the calculation of location may be based on TDOA and a single TOF measurement with a KD. As illustrated in FIG. 15, there are 3 KDs and one UD (not shown). The KD's are synchronized to an MD:

1) The UD transmits a ping to the KDs;
2) The KDs receive the signal and record the arrival time in the MD time units: $T_{arrival-KDi-MD}$ for i={1,2,3}
3) As shown in FIG. 10, a TOF time can be obtained between one of the KDs and the UD. In this case, it is between the KD2 and the UD.
4) A clumping method is applied where $T_{depart}$ is varied to produce the distances from KDs to UD except for the KD2. The calculated distance of KD2 is determined by the product of the TOF$_{KD2-UD}$ and the speed of light (TOF$_{KD2-UD}$*C$_{speed-of-light}$). This distance remains unchanged despite the varying values of T$_{depart}$.

5) T$_{depart}$ values are chosen near the calculated T$_{depart}$, denoted by T$_{depart-tof}$ where T$_{depart-tof}$ is calculated as:

$$T_{depart-tof} = T_{arrival-KD2-MD} - TOF_{KD2-UD} \quad \text{Eqn. (34); and}$$

6) Depending on the degree of noise from the TOF measurement and the arrival time measurements, a suitable range around T$_{depart-tof}$ can be chosen for T$_{depart}$.

Thus, a TOF measurement with one KD can augment the localization for TDOA in the clumping method.

Referring to FIG. 15, KD1, KD2, KD3 are all synchronized to an MD. Further, KD2 has performed a TOF measurement with the UD similar to that discussed above with respect to FIG. 10. Based on the TOF measurement, suitable values of T$_{depart}$ are chosen. For one value of T$_{depart}$, T1, the radius circles generated are C1-T1 and C3-T1. Note that the circle, C2, for KD2 is determined from the TOF measurement so it does not change in size. For circles with T$_{depart}$=T1, it can be noted there is no real clumping of points. For T$_{depart}$=T2, the circles for KD1 are C1-T2 and for KD3, it is C3-T2. Again, C2 does not change in size. Here one can see how the point, P1, is near all the other circles.

Though the examples in the previous paragraphs and Figures use three KDs and one UD, this solution can be expanded to include multiple KDs and multiple UDs.

Though the examples in the previous paragraphs and Figures depict just planar solutions (i.e. x and y), they can also be used for 3D solutions (i.e. x, y, and z). In specific, for the clumping methods in three dimensions, instead of a circle, each KD is associated with a sphere with radius DUD-KDj. Three intersecting spheres can produce two points, Pi. With the points, Pi, the existing clumping method can be used to determine location of the UD.

Example embodiments are described above with reference to block diagrams and/or flowchart illustrations of methods, devices, systems and/or computer program products. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the functions/acts specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, example embodiments may be implemented in hardware and/or in software (including firmware, resident software, micro-code, etc.). Furthermore, example embodiments may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of data processing systems discussed herein may be written in a high-level programming language, such as Java, AJAX (Asynchronous JavaScript), C, and/or C++, for development convenience. In addition, computer program code for carrying out operations of example embodiments may also be written in other programming languages, such as, but not limited to, interpreted languages. Some modules or routines may be written in assembly language or even micro-code to enhance performance and/or memory usage. However, embodiments are not limited to a particular programming language. It will be further appreciated that the functionality of any or all of the program modules may also be implemented using discrete hardware components, one or more application specific integrated circuits (ASICs), or a field programmable gate array (FPGA), or a programmed digital signal processor, a programmed logic controller (PLC), or microcontroller.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

In the drawings and specification, there have been disclosed exemplary embodiments of the inventive concept. However, many variations and modifications can be made to these embodiments without substantially departing from the principles of the present inventive concept. Accordingly, That which is claimed is:

1. A method of determining a location of an unknown device (UD) from a plurality of known devices (KDs), the method comprising:
receiving, at the UD, periodically broadcasted messages from each of a plurality of KDs;
recording a corresponding arrival time stamp ($T_{arrival-i-UD}$) of each periodically broadcasted message from each of the plurality of KDs, wherein each of the plurality of KDs are clock synchronized to a common clock source at a master device (MD), wherein a departure time of the periodically broadcasted message from each of the plurality of KDs is known by the UD in master device time units ($T_{depart-i-md}$) and wherein x, y and z coordinates of a location of each of the KDs is known by the UD; and
calculating the x, y and z coordinates of an actual location of the UD using the x, y and z coordinates of each of the KDs, the recorded arrival times ($T_{arrival-i-UD}$) of each of the periodically broadcasted messages from each of the plurality of KDs and the known departure times of each of the periodically broadcasted messages ($T_{depart-i-md}$) from each of the plurality of KDs,
wherein calculating the x, y and z coordinates of the actual location of the UD further comprises:
selecting possible x, y and z coordinates ($L_{guess}$) of the location of the UD;
calculating a distance ($D_i$) from the possible location of the UD ($L_{guess}$) to each of the plurality of KDs;
translating the distances (Di) into corresponding estimated departure times of the periodically broadcasted messages ($T_{depart-ud-i}$) in UD clock units from each of the plurality of KDs based on the recorded arrival time stamp ($T_{arrival-i-UD}$) of each periodically broadcasted messages from each of the plurality of KDs and the corresponding distance (Di) for each of the plurality of KDs;
determining differences in the estimated departure times of the periodically broadcasted messages ($T_{depart-i-ud}$) in UD clock units and the known departure time of the periodically broadcasted message from each of the plurality of KDs in master device time units ($T_{depart-i-md}$) to provide an error offset; and
modifying the possible x, y and z coordinates ($L_{guess}$) of the location of the UD based on the error offset to obtain the actual location of the UD.

2. The method of claim 1, wherein the departure time of the periodically broadcasted message from each of the plurality of KDs ($T_{depart-i-md}$) is one of embedded in each of the periodically broadcasted messages from each of the plurality of KDs ($KD_i$) and known a-priori by the UD.

3. The method of claim 1, further comprising repeating the calculating, translating, determining and modifying periodically to refine the actual location.

4. The method of claim 3, wherein the method is based on a gradient descent approach.

5. The method of claim 1, wherein a clock rate of the UD and of the MD are significantly different, the method further comprising:
modeling the calculated differences in the estimated departure times of the periodically broadcasted messages ($T_{depart-i-ud}$) in UD clock units and the known departure time of the periodically broadcasted message from each of the plurality of KDs in master device time units ($T_{depart-i-md}$) as a constant offset ($T_{offset-const}$) and a linear term based on clock timing differences of the MD and UD clocks ($K_{clock-dif}$); and
calculating the error offset using the clock timing differences of the MD and UD clocks ($K_{clock-dif}$).

6. The method of claim 1, wherein the plurality of KD are periodically turned on and/or off to conserve power.

7. The method of claim 6, wherein when the plurality of KDs are turned on the plurality of KDs exchange messages for use in synchronizing clocks at the plurality of KDs.

8. The method of claim 1, wherein the plurality of KDs periodically broadcast messages within a predetermined time period.

9. The method of claim 1:
wherein periodically broadcasting a message comprises periodically broadcasting a message from each of the plurality of KDs including the x, y, z coordinates of the KDs location; and
wherein calculating the x, y and z coordinates of the actual location of the UD comprises calculating the actual location using the x, y, z coordinates of the each of KDs location provided in the periodically broadcasted message.

10. The method of claim 1, further comprising powering down the UD between periodically broadcasted messages to conserver power.

11. The method of claim 1, wherein calculating the actual location of the UD is followed by synchronizing a clock of the UD to the clock of the MD such that both arrival and departure times are known in the MD clock units.

12. The method of claim 11, wherein calculating the actual location of the UD further comprises:
calculating distances from the UD to the plurality of KDs directly by determining a difference between arrival and departure times to provide a time of flight; and
multiplying the time of flight by the speed of light.

13. The method of claim 12, further comprising determining location using triangulation.

14. A system including a plurality of known devices (KDs) and at least one unknown device (UD), the system comprising:
at least one unknown device (UD) configure to:
receive periodically broadcasted messages from each of a plurality of KDs;
record a corresponding arrival time stamp ($T_{arrival-i-UD}$) of each periodically broadcasted message from each of the plurality of KDs, wherein each of the plurality of KDs are clock synchronized to a common clock source at a master device (MD), wherein a departure time of the periodically broadcasted message from each of the plurality of KDs is known by the UD in master device time units ($T_{depart-i-md}$) and wherein x, y and z coordinates of a location of each of the KDs is known by the UD; and
calculate the x, y and z coordinates of an actual location of the UD using the x, y and z coordinates of each of the KDs, the recorded arrival times ($T_{arrival-i-UD}$) of each of the periodically broadcasted messages from each of the plurality of KDs and the known departure times of each of the periodically broadcasted messages ($T_{depart-i-md}$) from each of the plurality of KDs,
wherein the at least one UD is further configured to calculate the x, y and z coordinates of the actual location of the at least one UD by:
selecting possible x, y and z coordinates ($L_{guess}$) of the location of the UD;

calculating a distance ($D_i$) from the possible location of the UD ($L_{guess}$) to each of the plurality of KDs;

translating the distances (Di) into corresponding estimated departure times of the periodically broadcasted messages ($T_{depart-ud-i}$) in UD clock units from each of the plurality of KDs based on the recorded arrival time stamp ($T_{arrival-i-UD}$) of each periodically broadcasted messages from each of the plurality of KDs and the corresponding distance (Di) for each of the plurality of KDs;

determining differences in the estimated departure times of the periodically broadcasted messages ($T_{depart-i-ud}$) in UD clock units and the known departure time of the periodically broadcasted message from each of the plurality of KDs in master device time units ($T_{depart-i-md}$) to provide an error offset; and modifying the possible x, y and z coordinates ($L_{guess}$) of the location of the UD based on the error offset to obtain the actual location of the UD.

15. The system of claim 14, wherein at least one of the plurality of KDs comprise an integrated, highly precise clock such that methods of time synchronization are not performed in coordination of each broadcast message.

16. The system of claim 14:

wherein each of the plurality of KDs has a unique identifier (ID); and wherein the UD is configured to lookup the unique ID of each of the plurality of KDs locally or externally to access the x,y,z location of each of the plurality of KDs.

17. The system of claim 14, where the at least one UD and the MD include highly precise clocks.

* * * * *

UNITED STATES PATENT AND TRADEMARK OFFICE
CERTIFICATE OF CORRECTION

| | |
|---|---|
| PATENT NO. | : 11,463,971 B2 |
| APPLICATION NO. | : 16/662307 |
| DATED | : October 4, 2022 |
| INVENTOR(S) | : Seth Edward-Austin Hollar |

It is certified that error appears in the above-identified patent and that said Letters Patent is hereby corrected as shown below:

On the Title Page

(56) References: Please correct "2002/0097182 7-2002 Goren" to read -- 2002/0097182 7-2002 Goren et al. --

In the Specification

Column 7, Line 20, Equation 8: Please correct "$T_{dif} = (T_{event-md}$" to read -- $T_{dif} \times (T_{event-md}$ --

Signed and Sealed this
Twenty-second Day of November, 2022

Katherine Kelly Vidal
*Director of the United States Patent and Trademark Office*